United States Patent
Sanders et al.

(10) Patent No.: US 11,716,639 B2
(45) Date of Patent: Aug. 1, 2023

(54) SELF-HEALING OF REPEATER FORMATION IN A NETWORK

(71) Applicant: ABL IP HOLDING LLC, Conyers, GA (US)

(72) Inventors: Alan David Sanders, Atlanta, GA (US); Akshaykeerti Sharma, Alanta, GA (US); Scott J. Ingraham, Snellville, GA (US); Richard L. Westrick, Jr., Social Circle, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 156 days.

(21) Appl. No.: 17/398,390

(22) Filed: Aug. 10, 2021

(65) Prior Publication Data

US 2023/0052427 A1 Feb. 16, 2023

(51) Int. Cl.
| | |
|---|---|
| *H04W 24/02* | (2009.01) |
| *H04W 60/00* | (2009.01) |
| *H04L 43/10* | (2022.01) |
| *H04L 12/26* | (2006.01) |
| *H04W 88/16* | (2009.01) |

(52) U.S. Cl.
CPC ............. *H04W 24/02* (2013.01); *H04L 43/10* (2013.01); *H04W 60/00* (2013.01); *H04W 88/16* (2013.01)

(58) Field of Classification Search
CPC ..... H04W 24/02; H04W 60/00; H04W 88/16; H04L 43/10
See application file for complete search history.

(56) References Cited

U.S. PATENT DOCUMENTS

| | | | |
|---|---|---|---|
| 5,343,466 A | 8/1994 | Kawamura | |
| 5,974,236 A * | 10/1999 | Sherman | H04W 40/125 370/255 |
| 7,554,932 B1 * | 6/2009 | Shurmantine | H04L 1/1867 370/293 |

(Continued)

OTHER PUBLICATIONS

Centenaro et al. "Long-range Communications in Unlicensed Bands: The Rising Stars in the IoT and Smart City Scenarios." IEEE Wireless Communications 23.5, Oct. 2016, pp. 60-67.

(Continued)

*Primary Examiner* — Eunsook Choi
(74) *Attorney, Agent, or Firm* — RatnerPrestia

(57) ABSTRACT

An example method includes, in response to receiving a gateway heartbeat message from a lighting system non-connected gateway RF node, incrementing a gateway heartbeat counter. In response to receiving a repeater RF node heartbeat message from a network RF node of lighting system non-connected network RF nodes set to a repeater role, incrementing a repeater heartbeat counter. In response to a cycle time exceeding a cycle time timeout, the gateway heartbeat counter not exceeding a gateway heartbeat threshold, and the repeater heartbeat counter exceeding a repeater heartbeat threshold, selecting a selected network RF node of the RF nodes set to the repeater role. Transmitting, via an extended star wireless network, a registration message to the selected network RF node. In response to transmitting the registration message and having a network RF node role state set to an unconnected role, setting the network RF node role state to a connected role.

20 Claims, 9 Drawing Sheets

(56) References Cited

U.S. PATENT DOCUMENTS

| | | |
|---|---|---|
| 8,259,648 B2 | 9/2012 | Pratapagiri |
| 9,531,632 B2 | 12/2016 | Hellhake et al. |
| 9,820,361 B1* | 11/2017 | Turvy, Jr. ............... H04M 11/00 |
| 9,883,570 B1 | 1/2018 | Turvy, Jr. et al. |
| 10,143,056 B2 | 11/2018 | Wagner et al. |
| 2002/0042274 A1 | 4/2002 | Ades |
| 2003/0109270 A1 | 6/2003 | Shorty |
| 2003/0179721 A1* | 9/2003 | Shurmantine ......... H04W 88/04 |
| | | 370/392 |
| 2003/0202468 A1 | 10/2003 | Cain et al. |
| 2004/0218548 A1 | 11/2004 | Kennedy et al. |
| 2006/0153132 A1 | 7/2006 | Saito |
| 2006/0242295 A1 | 10/2006 | Husemann et al. |
| 2007/0097945 A1 | 5/2007 | Wang et al. |
| 2007/0182571 A1 | 8/2007 | Kennish et al. |
| 2007/0189256 A1 | 8/2007 | Oh |
| 2008/0253394 A1 | 10/2008 | Spinar et al. |
| 2009/0105567 A1 | 4/2009 | Smith et al. |
| 2009/0175235 A1 | 7/2009 | Spinar et al. |
| 2009/0219879 A1 | 9/2009 | Zimmerman et al. |
| 2011/0010446 A1* | 1/2011 | Chen ....................... H04L 45/20 |
| | | 709/224 |
| 2012/0076007 A1 | 3/2012 | Nelson |
| 2013/0083688 A1 | 4/2013 | Mageed Al-Talib et al. |
| 2014/0016488 A1 | 1/2014 | Xu et al. |
| 2014/0040483 A1 | 2/2014 | Van Dussen et al. |
| 2015/0003309 A1 | 1/2015 | Mukherjee |
| 2015/0208490 A1 | 7/2015 | Bishop et al. |
| 2016/0219516 A1 | 7/2016 | Subramanian et al. |
| 2016/0291127 A1 | 10/2016 | Huang et al. |
| 2017/0265046 A1 | 9/2017 | Chen et al. |
| 2017/0325103 A1 | 11/2017 | Casebolt et al. |
| 2017/0353940 A1 | 12/2017 | Seth et al. |
| 2017/0366935 A1 | 12/2017 | Ahmadzadeh et al. |
| 2018/0026839 A1 | 1/2018 | Hollinger et al. |
| 2018/0054237 A1 | 2/2018 | Tseng et al. |
| 2018/0089014 A1* | 3/2018 | Smith ..................... H04L 43/04 |
| 2018/0352414 A1 | 12/2018 | Zhang et al. |
| 2019/0020572 A1 | 1/2019 | Hu et al. |
| 2019/0069263 A1 | 2/2019 | Ylamurto et al. |
| 2019/0197896 A1 | 6/2019 | Bakhishev et al. |
| 2019/0308579 A1 | 10/2019 | Jouper et al. |
| 2019/0320494 A1* | 10/2019 | Jayawardene ......... H04W 36/08 |
| 2019/0342709 A1 | 11/2019 | Markhovsky et al. |
| 2020/0077336 A1 | 3/2020 | Moner Poy et al. |
| 2020/0112508 A1 | 4/2020 | di Marco et al. |
| 2020/0135028 A1 | 4/2020 | Bakhishev et al. |
| 2020/0162997 A1 | 5/2020 | Damnjanovic |
| 2020/0186378 A1 | 6/2020 | Six et al. |
| 2020/0226895 A1 | 7/2020 | Masters |
| 2020/0274612 A1 | 8/2020 | Shah et al. |
| 2021/0282032 A1 | 9/2021 | Wen et al. |
| 2021/0345293 A1 | 11/2021 | Park et al. |
| 2021/0352716 A1 | 11/2021 | Baldemair et al. |
| 2021/0385662 A1 | 12/2021 | Furuichi |
| 2021/0385888 A1 | 12/2021 | Akl et al. |
| 2022/0322065 A1* | 10/2022 | Shekhar ................ H04W 48/16 |

OTHER PUBLICATIONS

Non Final Office Action for U.S. Appl. No. 16/662,691, dated Mar. 8, 2021, 11 pages.

Non Final Office Action for U.S. Appl. No. 16/825,264, dated Jul. 23, 2021, 34 pages.

Notice of Allowance for U.S. Appl. No. 16/662,691, dated Mar. 29, 2021, 5 pages.

Notice of Allowance for U.S. Appl. No. 16/811,072, dated May 12, 2021, 10 pages.

Qayyum et al. "Multipoint Relaying for Flooding Broadcast Messages in Mobile Wireless Networks," 35th Annual Hawaii International Conference on System Sciences (HICSS'2002). Maui, United States, pp. 3386-3875.

Entire patent prosecution history of U.S. Appl. No. 16/987,740, filed Aug. 7, 2020, entitled, "Non-Coordinated Back-Off Timer Assignment."

Notice of Allowance for U.S. Appl. No. 16/825,264, dated Nov. 1, 2021, 8 pages.

Canadian Examination Report for Application No. 3,094,674, dated Nov. 5, 2021, 5 pages.

Candadian Examination Report for Application No. 3,095,747, dated Nov. 8, 2021, 5 pages.

Canadian Examination Report for Application No. 3,094,882, dated Nov. 5, 2021. 5 pages.

Notice of Allowance for U.S. Appl. No. 16/984,252, dated Jun. 27, 2022, 20 pages.

Canadian Examination Report for Application No. 3,112,688, dated Mar. 17, 2022, 5 pages.

Non Final Office Action for U.S. Appl. No. 16/984,252, dated Dec. 24, 2021, 42 pages.

Notice of Allowance for U.S. Appl. No. 16/987,740, dated Dec. 30, 2021, 30 pages.

* cited by examiner

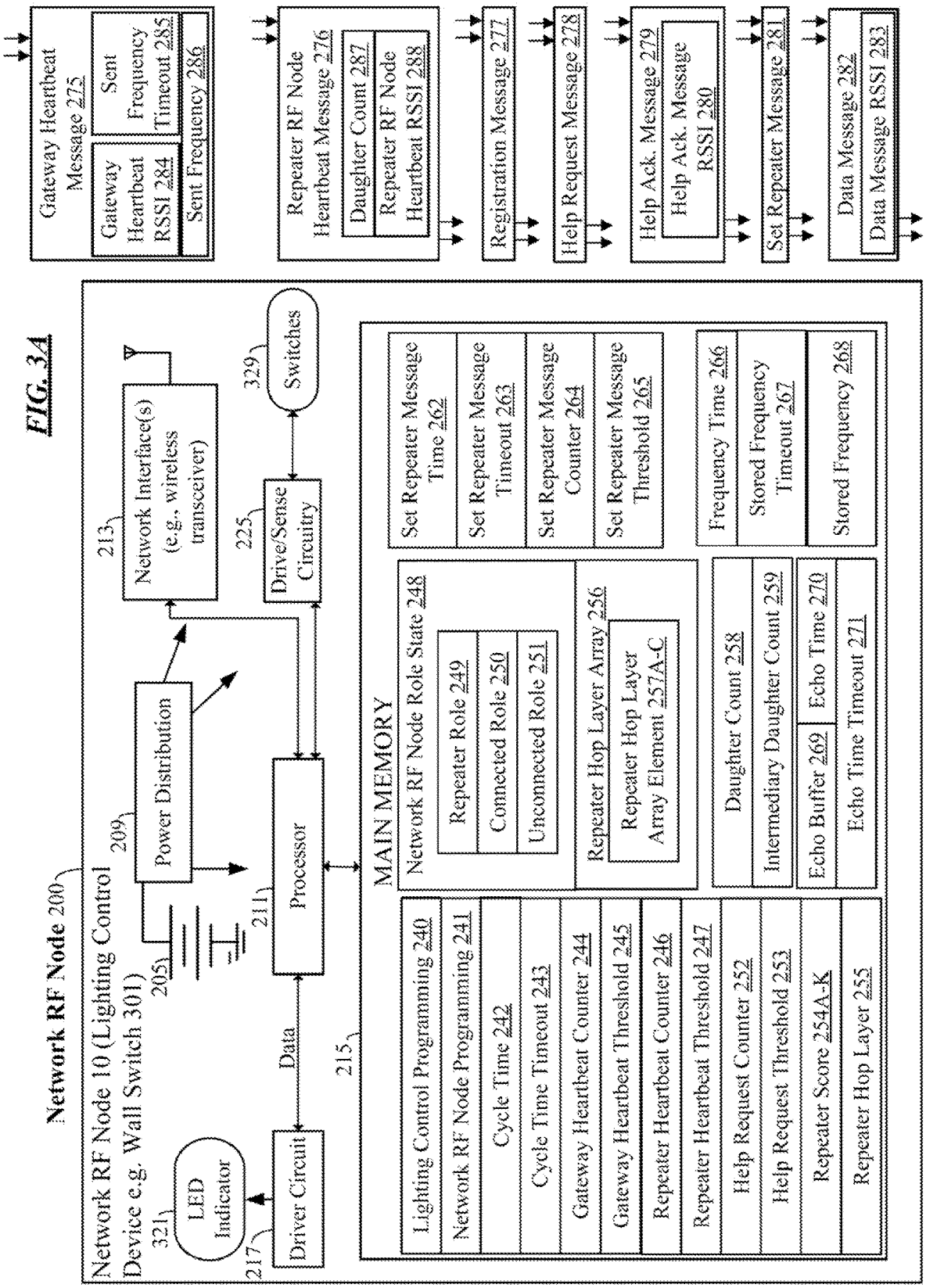

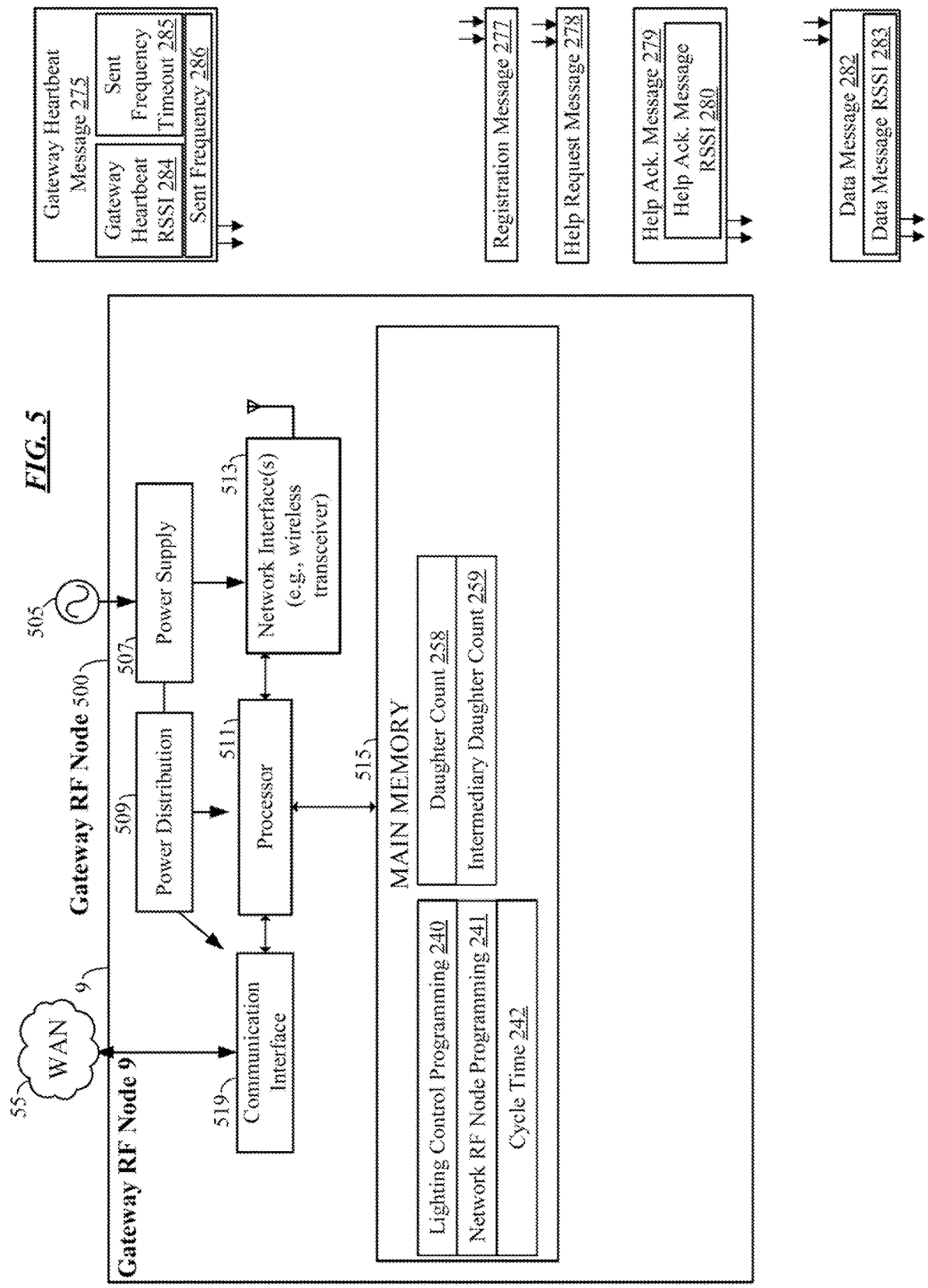

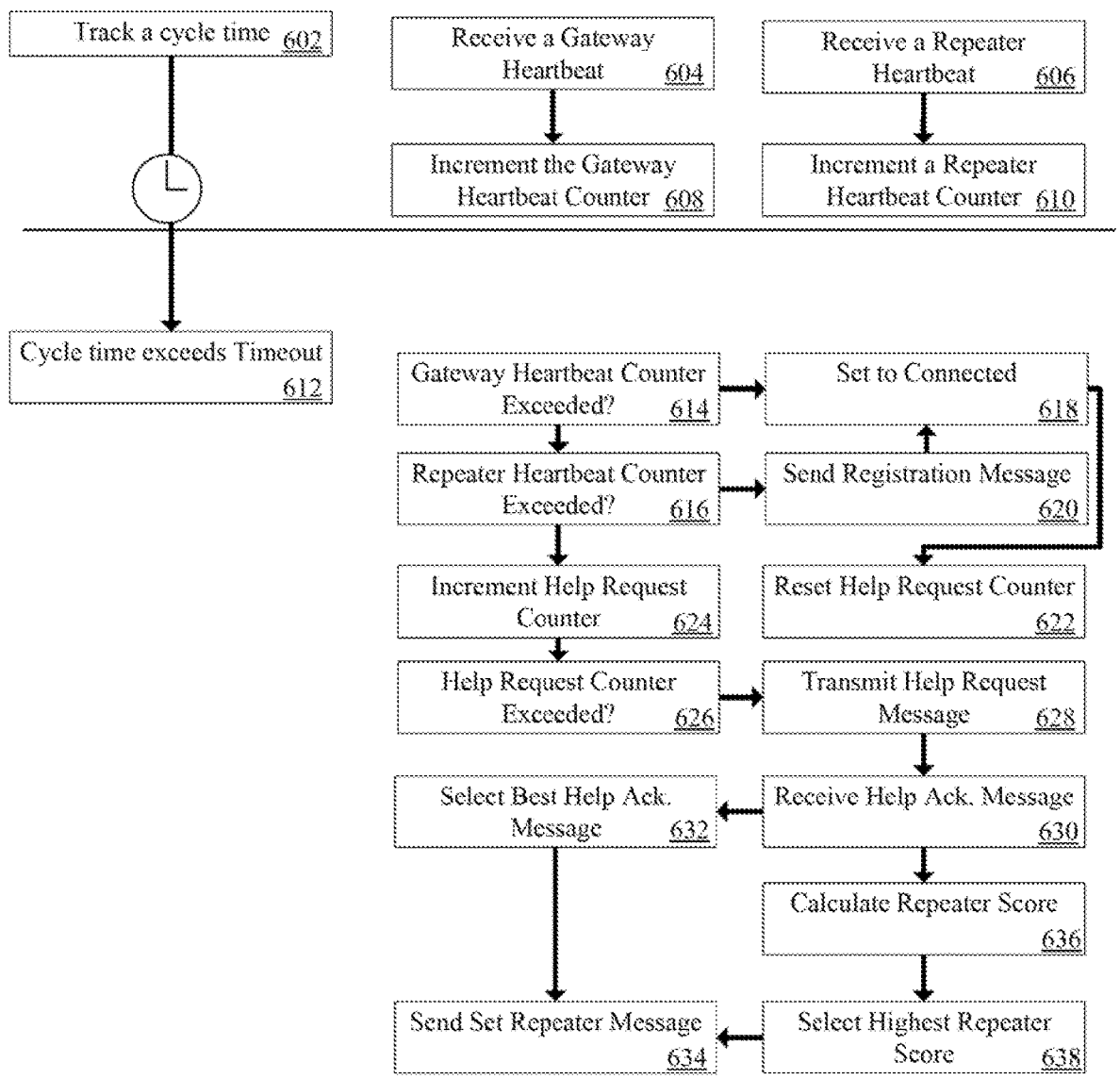

SELF-HEALING OF REPEATER FORMATION IN A NETWORK

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some devices, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

Conventional wall switches and light fixtures communicate over wired systems. More recent lighting systems are wireless, which allow communication over a radio frequency (RF) network; however, it is difficult to control these systems as the systems scale in size. Some wireless lighting communication control systems communicate over a routing mesh. In a routing mesh, network packets are addressed through the network one node to the next, as in A(B(D(F(E)))). If the network packet does not get through the network, the dropped network packet will need to be retransmitted. However, a healthy routing mesh may still drop some network packets, so long as a high enough proportion of messages reach their intended targets without retransmitting. One goal of a routing algorithm is to streamline communication through fewer nodes while minimizing extraneous network restructuring.

Some routing meshes use a star network. In a star network, every network packet sent from an outside source is sent by a gateway or hub RF node to the recipient RF node. Requiring that all messages pass through a single RF node fixes the maximum size of the routing mesh to within the range of the gateway RF node's radio strength.

Accordingly, a system is needed to overcome these and other limitations in the art. The described extended star luminaire network's algorithms optimize to reduce both the hop distance between any RF node and the gateway RF node, to reduce the number of RF nodes that process message hopping, as well as reducing network restructuring due to intermittent dropped network packets, healing and improving the functionality of the lighting network.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3A illustrates a functional block diagram of a lighting system wall switch RF node configured to act as a network RF node.

FIG. 5 illustrates a functional block diagram of a gateway RF node.

FIG. 6 is a flowchart of a network RF node connecting and servicing the extended star network.

DETAILED DESCRIPTION

Figure 1:
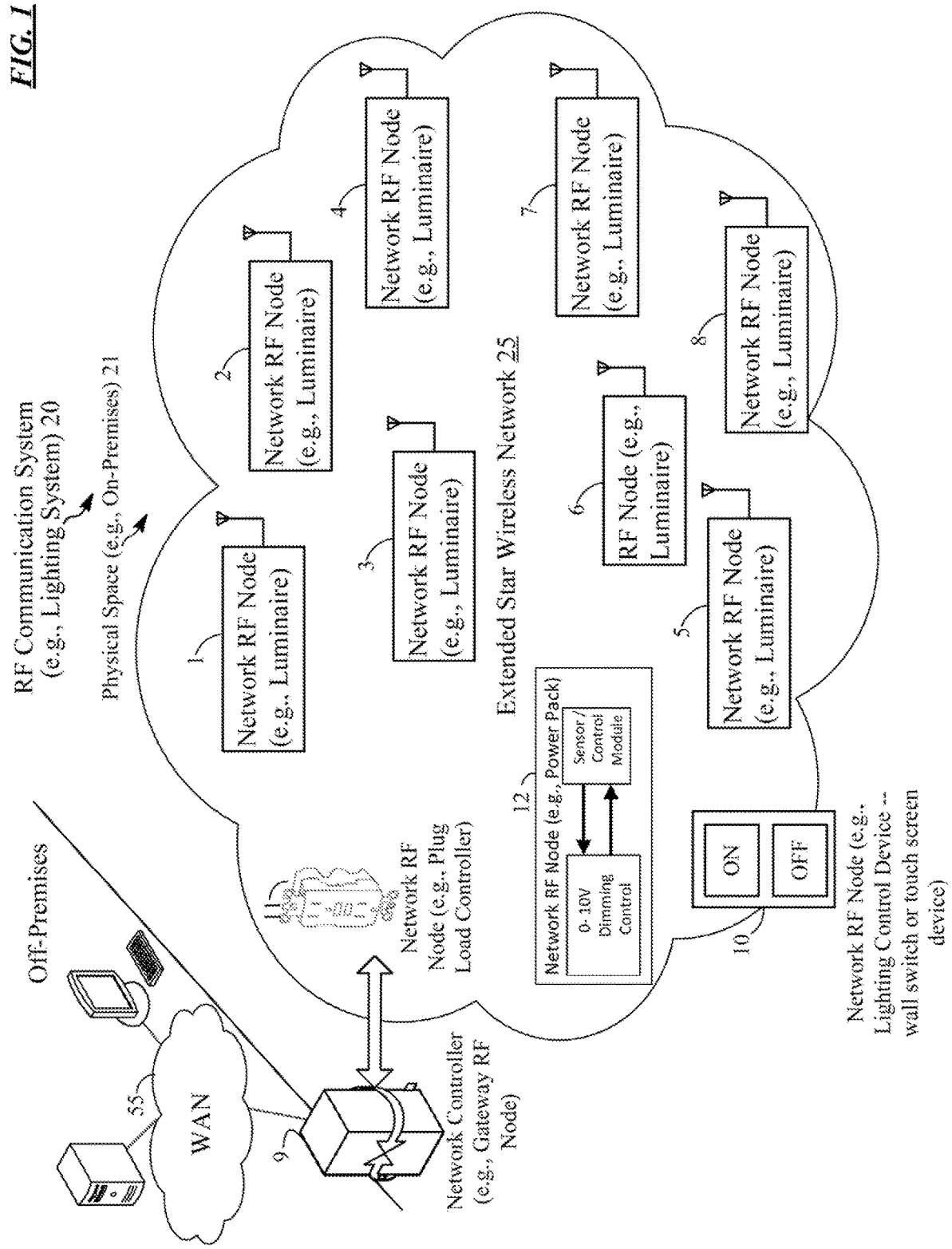
FIG. 1 illustrates a functional block diagram of an example of an RF communication system (e.g., wireless lighting system) that includes a flooding wireless network of RF nodes.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 illustrates a functional block diagram of an example of an RF communication system (e.g., wireless lighting system) 20 that includes an extended star wireless network 25 of radio frequency (RF) nodes. The extended star wireless network 25 supports light commissioning/control/maintenance to provide a variety of lighting control, including communications in support of turning lights on/off, dimming, set scene, and sensor trip events. In the example, the twelve RF nodes 1-12 include eight luminaires 1-8, a gateway (e.g., network controller) 9, lighting control device 10 (e.g., wall switch or touch screen device), a plug load controller 11, and a power pack 12. The number of RF nodes 1-12 in the extended star wireless network 25 (e.g., size) will vary as RF nodes join or leave the extended star wireless network 25; thus, the number of RF nodes may be greater or less than the twelve RF nodes shown.

Regarding extended star networks in RF communication systems, U.S. patent application Ser. No. 16/811,072, filed on Mar. 6, 2020, titled "Extended Star Luminaire Network Formed Using Heartbeat Messages" by applicant ABL IP Holdings, which is incorporated by reference as if fully set forth herein, describes a system and method for establishing and configuring an extended star network among RF node luminaires using heartbeat messages.

RF nodes 1-12 can execute network RF node programming (elements 241 of FIGS. 2, 3A-B, 4A-B) to change network RF node role states the extended star wireless network 25 and a lighting control application (element 240 of FIGS. 2, 3A-B, 4A-B) for communication over the extended star wireless network 25. In the example, RF nodes 1-8, 10-12 are each a network RF node (see element 200 of FIGS. 2, 3A-B, 4A-B and network controller 9 is a gateway RF node (see element 9 of FIG. 5). In an extended star wireless network 25, algorithms are used to designate certain RF nodes with a repeater role 249, which are capable of forwarding network packets from the gateway or other RF nodes with the repeater role 249 to recipient RF nodes.

Other RF nodes are designated with a connected role 250, which are capable of receiving network packets, but do not perform forwarding or echoing of network packets. RF nodes with the connected role 250 have access to the extended star wireless network 25 and have registered that fact with the gateway 9.

Still other RF nodes are designated with an unconnected role 251, which neither intentionally receive network packets, nor do they perform forwarding or echoing of network packets. RF nodes with the unconnected role 251 are incapable of communicating with the gateway 9, either directly or via a network RF node with the repeater role 249. The RF nodes with the unconnected role 251 cannot communicate with the extended star wireless network 25, even though they may be within the physical space 21. This may be due to the RF node with the unconnected role being out of range of the gateway 9 or an RF node with the repeater role 249, damage to the RF node with the unconnected role 251, or perhaps local electrical interference.

The number of network RF nodes 200 designated with the repeater role 249, connected role 250, and unconnected role 251 will vary depending on the RF signal strength in various locations of the physical space 21 where the RF nodes 1-12 are positioned.

In a lighting system, where various luminaires 201, lighting control devices (e.g., wall switch 301 or touch screen device 302)), plug load controllers 401, and power packs 402 are RF nodes 1-12, running messaging forwarding programming can be expensive in terms of processing time and electrical energy, even while no messages are being sent. Therefore, the extended star wireless network 25 benefits from having as few RF nodes 1-12 designated with the repeater role 249 as possible, in order to conserve energy and processing time across the entire extended star wireless network 25.

Additionally, the act of forwarding itself takes time as an RF node with the repeater role 249 processes incoming messages and properly routes them out. Therefore, the extended star wireless network 25 benefits substantially from every RF node 1-12 having as few RF nodes with the repeater role 249 as possible transmitting network packets between the gateway RF node (element 500 of FIG. 5), and any other given network RF node 200.

RF nodes 1-12 can execute network RF node programming 241 to designate RF nodes of the extended star wireless network 25 and a lighting control application with the repeater role 249, for communication over the extended star wireless network 25. RF nodes 1-12 are installed in a physical space (e.g., on-premises) 21, which can be in indoor or outdoor installation area.

Each RF node, such as luminaires 1-8, gateway 9, lighting control device 10, plug load controller 11, and power pack 12 can be equipped with a wireless network transceiver. For example, the wireless network transceiver can include a near range Bluetooth Low Energy (BLE) radio that communicates over the extended star wireless network 25 for purposes of commissioning, maintenance, and control operation of the lighting system 20.

Plug load controller 11 plugs into existing AC wall outlets, for example, and allows existing wired lighting devices, such as table lamps or floor lamps that plug into a wall outlet, to operate in the lighting system 20. Plug load controller 11 instantiates a wired lighting device, such as a table lamp or floor lamp, by allowing for commissioning and maintenance operations and processes wireless lighting controls in order to the allow the wired lighting device to operate in the lighting system 20.

Power pack 12 retrofits with existing wired light fixtures (luminaires). Power pack 12 instantiates the wired light fixture by allowing for commissioning and maintenance operations and processes wireless lighting controls in order to allow a wired lighting device to operate in the lighting system 20.

It should be understood that in the example herein, the luminaires 1-8, gateway 9, lighting control device 10, plug load controller 11, and power pack 12 are just one example of an RF node, which includes additional components. Hence, the network RF node programming 241 of FIGS. 2, 3A-B, 4A-B described herein can be applied to various other types of RF nodes.

Generally, RF nodes 1-12 include a subset of components, for example, as shown in FIGS. 2, 3A-B, 4A-B, and 5 the RF node includes a network RF node wireless transceiver 213, network RF node processor 211, and a network RF node memory 215, 515. However, the programming, messages, etc. stored and utilized in the network RF node memory 215, 515 varies depending on whether the RF node 1-12 is designated with the repeater role 249, the connected role, and the unconnected role 251. Hence, the RF nodes 1-12 do not have to include the light source 219, LED indicator 321, touch screen 323, driver circuit 217, drive/sense circuitry 225, detector(s) 227, and switch(es) 329 components. An RF node 1-12 can also implement the gateway RF node 9 of FIG. 5 and thus may include components like that shown in FIG. 5 for the gateway RF node 9. A wireless beacon is an example of an RF node that is a chip with a radio that emits a signal with a certain signal strength, small packets of information, and has an RF positioning node identifier. RF nodes 1-12 can be connected together via the extended star wireless network 25.

Figure 2:
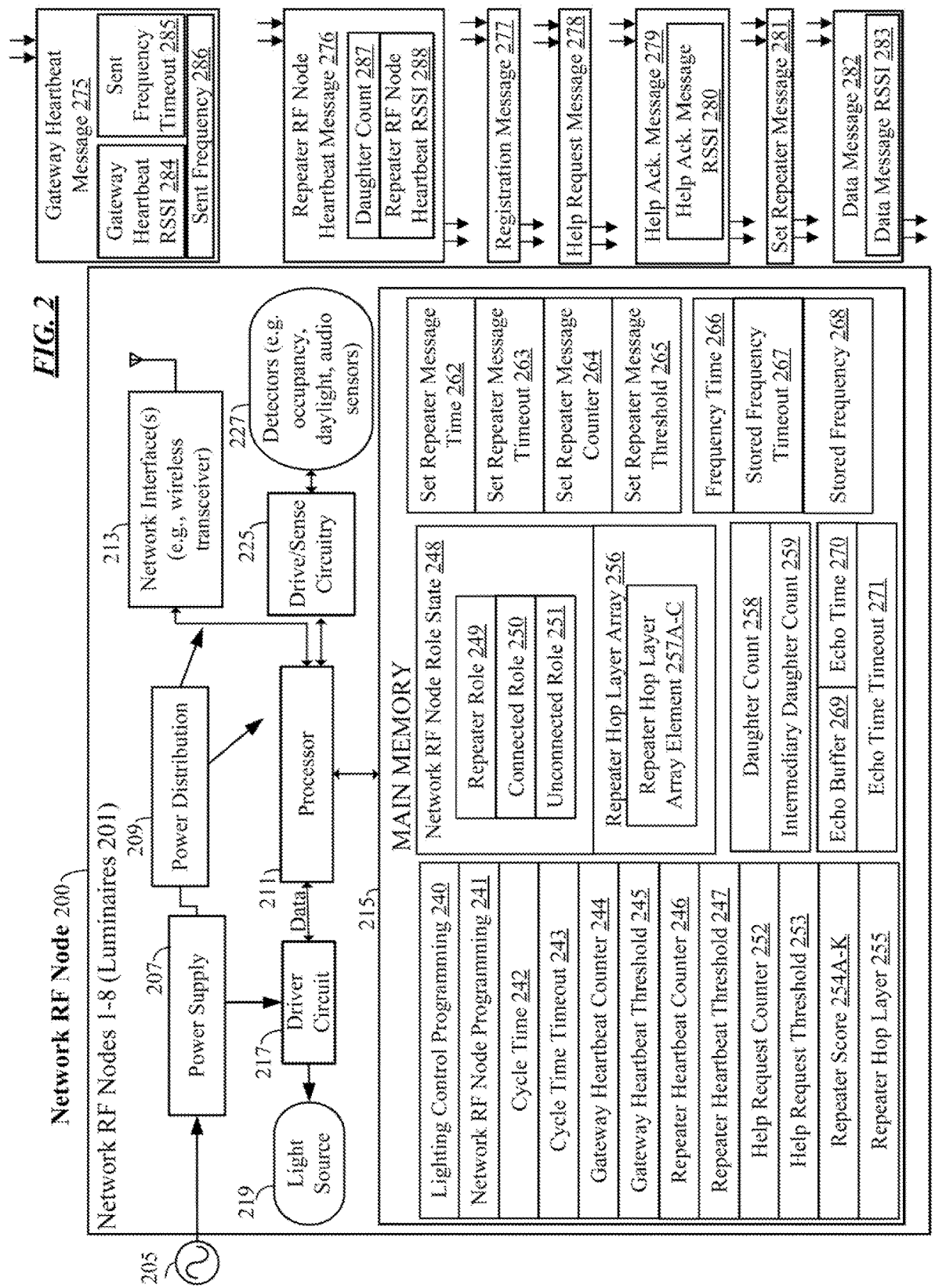
FIG. 2 illustrates a functional block diagram of a lighting system luminaire RF node configured to act as a network RF node.

FIG. 2 is a block diagram of RF nodes 1-8, which are luminaire(s) 201 in the example. In this example of FIG. 2, each of the RF nodes 1-8 are configured as a network RF node 200 that communicates via the extended star wireless network 25 in the lighting system of FIG. 1. The network RF node 200 includes a subset of the components of the luminaire RF node 201 of FIG. 2, including the network RF node processor 211, network interface(s) 213, and various programming, messages, identifiers, etc. shown in the network RF node memory 215. In FIG. 2, drive/sense circuitry 225 and detectors 227 can be on-board the luminaire RF node 201. Detectors 227 can be infrared sensors for occupancy or motion detection, an in-fixture daylight sensor, an audio sensor, a temperature sensor, or other environmental sensor. Drive/sense circuitry 225, such as application firmware, drives the occupancy, audio, and photo sensor hardware.

The luminaire RF node 201 includes a power supply 207 driven by a power source 205. Power supply 207 receives power from the power source 205, such as an AC mains, battery, solar panel, or any other AC or DC source. Power supply 207 may include a magnetic transformer, electronic transformer, switching converter, rectifier, or any other similar type of circuit to convert an input power signal into a power signal suitable for light source 219. Light source 219 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 219 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Luminaire RF node 201 further includes, a driver circuit 217, for example, an intelligent light emitting diode (LED) driver circuit. Driver circuit 217 is coupled to light source 219 and drives that light source 219 by regulating the power to light source 219A by providing a constant quantity or power to light source 219 as its electrical properties change with temperature, for example. The driver circuit 217 provides power to light source 219. Driver circuit 217 may be a constant-voltage driver, constant-current driver, or AC LED driver type circuit that provides dimming through a pulse width modulation circuit and may have many channels for separate control of different LEDs or LED arrays that comprise light source 219. An example of a commercially available intelligent LED driver circuit 217 is manufactured by EldoLED®.

Driver circuit 217 can further include an AC or DC current source or voltage source, a regulator, an amplifier (such as a linear amplifier or switching amplifier), a buck, boost, or buck/boost converter, or any other similar type of circuit or component. Driver circuit 217 outputs a variable voltage or current to the light source 219 that may include a DC offset, such that its average value is nonzero, and/or an AC voltage.

For purposes of communication and control, luminaire RF node 201 is treated as a single or a multi-addressable device that can be configured to operate as a member of the extended star wireless network 25. Luminaire RF node 201 includes power distribution circuitry 209, a network RF node processor 211, and a network RF node memory 215. As shown, network RF node processor 211 is coupled to driver circuit 217 and the network RF node processor 211 includes a central processing unit (CPU) that controls the light source operation of the light source 219. Network RF node memory 215 can include volatile and non-volatile storage.

The power distribution circuitry 209 distributes power and ground voltages to the network RF node processor 211, network RF node memory 215, network communication interface(s) 213 (e.g., network RF node wireless transceivers), drive/sense circuitry 225, and detector(s) 227 to provide reliable operation of the various circuitry on the luminaire RF node 201.

Network communication interface(s) 213 allows for data communication (e.g., wired or wireless) over various networks, including the extended star wireless network 25. For example, luminaire RF node 201 can includes one band, dual-band, or tri-band wireless radio communication interface system of network communication interface(s) 213 configured for wireless communication via separate radios that operate at three different frequencies, such as sub-GHz (e.g., 900 MHz), Bluetooth Low Energy (BLE) (2.4 GHz), and 5 GHz, for example. At least one network RF node wireless transceiver 213 is for communication over the extended star wireless network 25.

Network RF node processor 211, including like that shown for the processor/CPU 511 of gateway 9 in FIG. 5, serve to perform various operations, for example, in accordance with instructions or programming executable by processors 211, 511. For example, such operations may include operations related to communications with various lighting system 20 elements, such as RF nodes 1-12 during the self-healing heartbeat protocol 600 described herein. Although a processor 211, 511 may be configured by use of hardwired logic, typical processors are general processing circuits configured by execution of programming. Processors 211, 511 include elements structured and arranged to perform one or more processing functions, typically various data processing functions. Although discrete logic components could be used, the examples utilize components forming a programmable CPU. A processor 211, 511 for example includes one or more integrated circuit (IC) chips incorporating the electronic elements to perform the functions of the CPU. The processors 211, 511 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in RF nodes 1-12.

Memory 215 like that shown in FIGS. 2, 3A-B, 4A-B and memory 515 like that shown in FIG. 5 are for storing data and programming. In the example, the main memory system 215, 515 may include a flash memory (non-volatile or persistent storage) and a random access memory (RAM) (volatile storage). The RAM serves as short term storage for instructions and data being handled by the processor 211, 511, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with RF nodes 1-12, including gateway RF node 9, luminaire 201, wall switch 301, touch screen device 302, plug load controller 401, and power pack 402. Program aspects of the technology may be thought of as "products" or "articles of manufacture" typically in the form of executable code or process instructions and/or associated data that is stored on or embodied in a type of machine or processor readable medium (e.g., transitory or non-transitory), such as network RF node memory 215, 515, or a memory of a computer used to download or otherwise install such programming into the RF nodes 1-12, or a transportable storage device or a communications medium for carrying program for installation in the RF nodes 1-12.

As shown, the luminaire 200 includes programming in the network RF node memory 215, which configures the network RF node processor 211 to control operations of the light source 219, including the communications over the network communication interface(s) 213 via the wireless network interface(s) 213. The programming in the network RF node memory 215 also includes lighting control programming 240 to control the light source 219.

This luminaire RF node 201 is configured to operate as a network RF node 200. The distinction between the repeater role 249, the connected role 250, and the unconnected role 251 is entirely within the network RF node memory 215: changing the network RF node role state 248 between the repeater role 249, the connected role 250, and the unconnected role 251 does not add or remove hardware components such as the light source 219, detectors 227, LED indicators 321, or AC power relay 433.

Therefore, FIGS. 1 and 2 depict a radio frequency (RF) communication system 20 comprising a plurality of RF nodes 1-12 including a gateway RF node 9 and a plurality of network RF nodes 1-8, 10-12. Each of the network RF nodes 1-8, 10-12 includes a network RF node wireless transceiver 213 configured for data communication over an extended star wireless 25 network that includes the plurality of network RF nodes 1-8, 10-12. A network RF node processor 211 coupled to the network RF node wireless transceiver 213. A network RF node memory 215 accessible to the network RF node processor 211 including network RF node programming 241 in the network RF node memory 215.

The network RF node memory 215 includes several stored values and features to facilitate the network RF node programming 241. A cycle time 242 is a timer or timing function, capable of starting, stopping, resetting, and generally tracking the passage of time. In this example, the cycle time 242 is a timer that counts up from zero. The cycle time timeout 243 is a time value to which the network RF node 200 compares the cycle time 242 to determine if a critical amount of time has passed. In this example, the cycle time timeout 243 is two-hundred and five seconds. The cycle time timeout 243 is based on how often the gateway 9 is scheduled to transmit a gateway heartbeat message 275—in this example, the gateway heartbeat message is scheduled to be transmitted every ten seconds, and therefore the cycle time timeout 243 represents a period of time equal to twenty gateway heartbeat messages 275 with a small additional period of time to account for latency of the twentieth or last gateway heartbeat message 275. Generally, the cycle time timeout 243 will be a multiple of how often the gateway is scheduled to transmit a gateway heartbeat message 274, with an optional additional fixed period of time to account for latency. The cycle time 242 surpassing the cycle time timeout 243 will result in a resetting or a demarcating of the cycle time 242.

The gateway heartbeat counter 244 counts the number of gateway heartbeat messages 275 received since the cycle time 242 has reset. In this example, because the cycle time timeout 243 is two-hundred and five seconds, and the gateway 9 is scheduled to transmit one gateway heartbeat message 275 every ten seconds, the maximum value for the gateway heartbeat counter 275 is two-hundred and five divided by ten with no remainder; or twenty. The gateway heartbeat threshold 245 is a number between one and the maximum value of the gateway heartbeat counter 275: in this example, the gateway heartbeat threshold 245 is nine. The gateway heartbeat threshold 245 represents a minimum direct connection quality between the network RF node 200 and the gateway 9: the network RF node 200 must receive nine of twenty gateway heartbeat messages 275 in the two-hundred and five second cycle time 242 to determine that the direct connection between the network RF node 200 and the gateway 9 is sufficiently strong.

The repeater heartbeat counter 246 counts the number of repeater RF node heartbeat messages 276 received since the cycle time 242 has reset. These repeater RF node heartbeat messages 276 are sent by other network RF nodes 200 with the repeater role 249 as their network RF node role state 248. As there is no theoretical limit to the number of nearby network RF nodes 200 with the repeater role 249, there is no upper limit on how many repeater RF node heartbeat messages 276 the network RF node 200 may receive. The repeater heartbeat threshold 247 is a number greater than one: in this example, it is eighteen. The repeater heartbeat threshold 247 represent a minimum connection quality to nearby network RF nodes 200 with the repeater role 249. It is presumed that if eighteen repeater RF node heartbeat messages 276 are received, even if all eighteen are received from separate network RF nodes 200 with the repeater role 249, at least one of those network RF nodes with the repeater role 249 will be able to provide a sufficiently strong network connection for transmitting messages through the extended star wireless network 25.

The help request counter 252 counts the number of times the cycle time 242 has reset without establishing a sufficiently strong connection to either the gateway 9 or a network RF node 200 with the repeater role 249. The help request threshold 253 is a number greater than one: in this example, the help request threshold 253 is based on repeater hop layer 255, the network address or identifier of the network RF node 200—network RF nodes 200 with a greater hop layer 255 will have a higher help request threshold 253, and using the network address or identifier of the network RF node 200 adds a factor of stochastic randomness in order to avoid a broadcast storm or overactive and overlapping help requests. The help request threshold 253 represents how long a network RF node 200 should wait without a sufficiently strong network connection for transmitting messages through the extended star wireless network 25 before it asks nearby network RF nodes 200 to change their network RF node role state 248 to the repeater role 249 to assist in transmitting messages.

The repeater score 254A-K is a score for nearby network RF nodes 200 used in determining which nearby network RF nodes 200 should be asked to change their network RF node role state 248 to the repeater role 249, if the nearby RF node 200 is in the connected role 250, or alternatively, which nearby network RF node 200 currently in the repeater role 249 should transmit messages through the extended star wireless network 25 on behalf of the scoring network RF node 200. The repeater score 245A-K is based upon the repeater hop layer 255, daughter count 287, and the repeater RF node heartbeat RSSI 288 of the incoming repeater RF node heartbeat message 276. The repeater hop layer 255 is the number of network RF node 200 between this network RF node 200 and the gateway 9: a network RF node 200 directly connected to the gateway would have a repeater hop layer 255 of one.

The network RF node role state 248 is the current state of the network RF node 200: what job is the network RF node 200 performing? In the repeater role 249, the network RF node 200 retransmits messages from the gateway 9 to other network RF nodes 200 connected to this network RF node. In the connected role 250, the network RF node 200 transmits messages to either the gateway 9 or an intermediary network RF node 200 in the repeater role 249: the network RF node 200 in the connected role 250 does not repeat messages, in order to reduce network traffic and overhead in the RF communication system 20. In the unconnected role 251, the network RF node 200 is awaiting both gateway heartbeat messages 275 and repeater RF node heartbeat messages 276 to facilitate connection to the extended star wireless network 25, and sends help request messages 278 if not enough gateway heartbeat messages 275 or repeater RF node heartbeat messages 276 are received. The network RF node role state 248 can only be a single value: for example, the repeater role 249 and the unconnected role 251 cannot be in superposition; the network RF node 200 may only have a single role at one time.

The repeater hop layer array 256 is used to store an intermediary repeater hop layer from prior cycle time 242 resets as a repeater hop layer array element 257A-C. In this example, the repeater hop layer array 256 stores the prior three intermediary repeater hop layer. In order to avoid having the repeater hop layer 255 change too aggressively or frequently, the repeater hop layer 255 is the minimum repeater hop layer array element 257A-C within the repeater hop layer array 256. Each time the cycle time 242 resets, the oldest repeater hop layer array element 257A-C is discarded, and a new repeater hop layer array element 257A-C is added. This repeater hop layer array element 257A-C is based upon the repeater hop layer 255 of the network RF node 200 operating in the repeater role 249 on behalf of this network RF node 200 plus one, or the repeater hop layer array element 257A-C is one if the network RF node is directly connected to the gateway 9.

The daughter count 258 is used by network RF nodes 200 in the repeater role 249 to track how many network RF nodes 200 the network RF node 200 in the repeater role 249 is directly assisting in transmitting messages on behalf of. The daughter count 258 is relevant to the repeater score 254A-F other nearby network RF nodes 200 will calculate about this network RF node 200: a higher daughter count 258 results in a higher repeater score 254A-K. As the daughter count 258 is based upon the number of directly assisted network RF nodes 200, and the number of directly assisted network RF nodes 200 can change every period a cycle time 242 resets, an intermediary daughter count 259 of network RF nodes 200 directly assisted since the cycle time 242 was reset is tracked. Once the cycle time 242 resets, the daughter count 258 is set to the intermediary daughter count 259, and the intermediary daughter count 259 is reset to zero. As registration messages 277 or set repeater messages 281 are received, the intermediary daughter count 259 is incremented.

The set repeater message time 262 is a timer or timing function tracked by a network RF node 200 in the repeater role 249, capable of starting, stopping, resetting, and generally tracking the passage of time. In this example, the set repeater message time 262 is a timer that counts up from zero. The set repeater message timeout 263 is a time value to which the network RF node 200 compares the set repeater message time 262 to determine if a critical amount of time has passed. In this example, the set repeater message time 262 is sixty-five seconds. The set repeater message timeout 263 is based on how often another network RF node 200 would transmit a set repeater message 281 or a registration message 277 if that other network RF node 200 was in need of assistance to connect to the extended star network 25. The set repeater message threshold 265 is the minimum number of network RF nodes 200 in need of assistance required to cause this network RF node 200 to assist: in this example, the set repeater message threshold 265 is one. If the set repeater message threshold 265 of one is not met, and zero other network RF nodes 200 need help in sixty-five seconds, or six heartbeat cycles, then it is unlikely that the network RF node needs to remain in the repeater role 249, and should change to the connected role 250.

The set repeater message counter 264 counts the number of registration messages 277 and set repeater messages 281 received by the network RF node 200. This set repeater message counter 264 is also stored as the intermediary daughter count 259.

The frequency time 266 is a timer or timing function similar to the cycle time 242. It is started if the gateway heartbeat message 275 or repeater RF node heartbeat message 276 includes instructions to change operating frequencies to a sent frequency 286. The stored frequency timeout 267 is a time value to which the network RF node 200 compares the set frequency time 266 to determine if a critical amount of time has passed. The stored frequency timeout 267 will be set to a sent frequency timeout 285 before the frequency time 266 is started. The stored frequency 268 is the frequency upon which the network RF node 200 communicates via the network interfaces 213 to the extended star wireless network 25. The stored frequency 268 will be changed to the sent frequency 286 upon the frequency time 266 exceeding the stored frequency timeout 267.

The echo buffer is a store of outgoing messages, particularly data messages 282. The network RF node 200 will attempt to periodically retransmit data messages 282 in the echo buffer 269 every period of time tracked by the echo time 270 exceeding the echo time timeout 271, until the network RF node 200 receives a copy of the data message 282 from a different network RF node 200, which indicates the data message 282 was received and retransmitted by the different network RF node 200. Additionally, the network RF node 200 may only retry resending a certain number of times—in this example, the network RF node will only make four attempts; and then the data message 282 is removed from the echo buffer 269. Once the copy of the data message 282 from the different network RF node 200 is received, the data message 282 is removed from the echo buffer 269.

The network RF node 200 sends and receives several types of messages relevant to the self-healing heartbeat protocol 600 of the extended star network 25. All of these messages may contain other messages, or be transported together with other messages. A message may have a single header, but two or more functionally separate message within the message. The network RF node 200 can receive a gateway heartbeat message 275, which has a gateway heartbeat received signal strength indication (RSSI) 284, used to determine connection quality. A network RF node 200 in the repeater role 249 will transmit a repeater RF node heartbeat message 276 in response to receiving a gateway heartbeat message 275.

A repeater RF node heartbeat message 276 can be received and sent by a network RF node 200. The repeater RF node heartbeat message 276 will contain either copies or summary data from the repeater RF node heartbeat message 276 or the gateway heartbeat message 275 received by the sender network RF node 200 of this repeater RF node heartbeat message 276.

A registration message 277 is sent to a network RF node 200 in the repeater role 249 by another network RF node 200 to indicate a need for repeating services to connect to the extended star network 25. Practically, this registration message 277 can be identical to a set repeater message 281, although some examples may draw a distinction, with registration messages 277 being sent to network RF nodes 200 in the repeater role 249, and set repeater messages 281 being sent to network RF nodes 200 in the connected role 250.

A help request message 278 is set by a network RF node 200 that has not received either a gateway heartbeat message 275 or a repeater RF node heartbeat message 276 since the help request counter 252 has been exceeded. Network RF nodes 200 in the repeater role 249 or the connected role 200 respond, with the a help acknowledgement message 279, including their respective daughter count 258, repeater hop layer 255, and implicitly with a help acknowledgement message RSSI 280, all used by the receiving network RF node 200 to calculate a repeater score 254A-K for the sender network RF node 200.

Finally, network RF nodes 200 transmit data messages 282, which may be related to anything, but in this example are likely related to the lighting control and lighting control programming 240. These data messages 282 are relevant because they implicitly include a data message RSSI 283. In order to further ensure the stability of the extended star network 25, the gateway heartbeat RSSI 284 and repeater RF node heartbeat RSSI 288 values should be lower than the data message RSSI 283 for a given connection between network RF nodes 200 or a network RF node and the gateway 9. If the data message RSSI 283 is higher than the gateway heartbeat RSSI 284 or the repeater RF node heartbeat RSSI 288, then it is likely that a sufficiently strong connection for the gateway heartbeat messages 275 and the repeater RF node heartbeat messages 286 will likely experience even fewer dropped network packets for the data messages 282, as the data messages 282 are transmitting at a stronger power and a consequently higher data message RSSI 283. Therefore, the data message received signal strength indication (RSSI) 283 of the data message 282 is greater than the gateway heartbeat RSSI 284 of the gateway heartbeat message 275, and the data message RSSI 284 of the data message 282 is greater than a respective repeater RF node heartbeat RSSI 288 of the respective repeater RF node heartbeat message 276.

Execution of the network RF node programming 241 by the network RF node processor 211 configures the network RF node 200 to implement the following functions. First, track the cycle time 242. Second, in response to receiving a gateway heartbeat message 275 from the gateway RF node 500, increment the gateway heartbeat counter 244. Third, in response to receiving a respective repeater RF node heartbeat message 276 from a respective network RF node 1 of the network RF nodes 1-12 set to the repeater role, increment the repeater heartbeat counter 246. Third, in response to the cycle time 242 exceeding the cycle time timeout 243, the gateway heartbeat counter 244 not exceeding the gateway heartbeat threshold 245, and the repeater heartbeat counter 246 exceeding the repeater heartbeat threshold 247, select a selected network RF node 1 of the RF nodes 1-12 set to the repeater role. Fourth, transmit, via the extended star wireless network 25, a registration message 277 to the selected network RF node 1. Fifth, in response to transmitting the registration message 277 to the selected RF node 1 and having the network RF node role state 248 set to the unconnected role 251, set the network RF node role state to the connected role 250.

Additionally, in response to the cycle time 242 exceeding the cycle time timeout 243, the gateway heartbeat counter 244 exceeding the gateway heartbeat threshold 245, and having the network RF node role state 248 set to the unconnected role 251, set the network RF node role state to the connected role 250.

In some examples, first, in response to the cycle time 242 exceeding the cycle time timeout 243 and the gateway heartbeat counter 244 exceeding the gateway heartbeat threshold 245 or the repeater heartbeat counter 246 exceeding the repeater heartbeat threshold 247, reset the help request counter 252. Second, in response to the cycle time 242 exceeding the cycle time timeout 243, the gateway heartbeat counter 244 not exceeding the gateway heartbeat threshold 245, and the repeater heartbeat counter 246 not exceeding the repeater heartbeat threshold 247, increment the help request counter 252. Third, in response to the help request counter 252 exceeding the help request threshold 253, transmit a help request message 278. Fourth, in response to transmitting the help request message 278, receive one or more help acknowledgement messages 279 sent from one or more neighbor RF network nodes 2 of the plurality of RF network nodes 1-12, the help acknowledgement messages 279 each including a help acknowledgement message received signal strength indication (RSSI) 280. Fifth, in response to receiving the one or more help acknowledgement messages 279, select a best help acknowledgement message 279, the best help acknowledgement message 279 having a highest help acknowledgement RSSI 280. Sixth, in response to selecting the best help acknowledgement message 279, transmit a set repeater message 281 to a preferred neighbor RF network node 2 of the one or more neighbor RF network nodes 1-12, the preferred neighbor RF network node 2 having sent the best help acknowledgement message 279.

Alternatively, first, calculate a repeater score 254A-K based upon a respective repeater hop layer 255 of the respective network RF node 3, a respective daughter count 258 of the respective network RF node 3, and a respective repeater RF node heartbeat received signal strength indication (RSSI) 288 of the respective repeater RF node heartbeat message 276 from the respective network RF node 3. Second, select a preferred repeater network RF node 3, the preferred repeater network RF node 3 having a highest repeater score 254C. Third, in response to selecting the preferred repeater network RF node 3, transmit a set repeater message 281 to the preferred repeater network RF node 3.

Fourth, in response to selecting the preferred repeater network RF node 3, set the repeater hop layer 255 to a preferred repeater hop layer 255 of the preferred repeater network RF node 3 plus one. Fifth, transmit the repeater RF node heartbeat message 276, the repeater RF node heartbeat message including the repeater hop layer 255

Further alternatively, fourth, in response to selecting the preferred repeater network RF node 3, create a respective repeater hop layer array element 257C equal to a preferred repeater hop layer 255 of the preferred repeater network RF node 3 plus one, and add the respective repeater hop layer array element 257C to the repeater hop layer array 256. Fifth, set the repeater hop layer 255 to a minimum repeater hop layer array element 257A-C of the repeater hop layer array 256. Sixth, transmit the repeater RF node heartbeat message 276, the repeater RF node heartbeat message including the repeater hop layer 255.

In response to receiving the help request message 278, and having the network RF node role state 248 set to the connected role 250 or having the network RF node role state 248 set to the repeater role 249, transmit the help acknowledgement message 279.

In response to receiving the set repeater message 281 and having the network RF node role state 248 set to the connected role 250, set the network RF node role state 248 to the repeater role 249.

Additionally, first, in response to the cycle time 242 exceeding the cycle time timeout 243, the gateway heartbeat counter 244 exceeding the gateway heartbeat threshold 245, and having the network RF node role state 248 set to the repeater role 249, set the repeater hop layer 255 to one. Second, transmit the repeater RF node heartbeat message 276, the repeater RF node heartbeat message 276 including the repeater hop layer 255.

Furthermore, in response to receiving the set repeater message 281 and having the network RF node role state 248 set to the repeater role 249, increment the intermediary daughter count 259. In response to the cycle time 242 exceeding the cycle time timeout 243 and having the network RF node role state 248 set to the repeater role 249, set the daughter count 258 equal to the intermediary daughter count 259, and reset the intermediary daughter count 259. Also, transmit the repeater RF node heartbeat message 276, the repeater RF node heartbeat message 276 including the daughter count 258, 287.

In addition, first, track the set repeater message time 262. Second, in response to receiving the set repeater message 281, increment the set repeater message counter 264. Third, in response to the set repeater message time 262 exceeding the set repeater message time timeout 263, the set repeater message counter 264 not exceeding the set repeater message threshold 265 and having the network RF node role state 248 set to the repeater role 249, set the network RF node role state to the connected role 250. Third, in response to the set repeater message time 262 exceeding the set repeater message timeout 263, reset the set repeater message time 262 and the set repeater message counter 264.

Transmit a data message 282. Also, in response to the cycle time 242 exceeding the cycle time timeout 243, reset the cycle time 242, the gateway heartbeat counter 244, and the repeater heartbeat counter 246.

Still further, first, in response to receiving the gateway heartbeat message 275 including the sent frequency 286 and the sent frequency timeout 285, set the stored frequency timeout 267 equal to the sent frequency timeout 285. Second track the frequency time 266. Third, in response to the frequency time 266 exceeding the stored frequency timeout 267, set the stored frequency 268 equal to the sent frequency 286.

Yet further, first, transmit an outgoing data message 282. Second, track the echo time 269. Third, add the outgoing data message 282 to the echo buffer 269. Fourth, in response to adding the outgoing data message 282 to the echo buffer 269, reset the echo time 270. Fifth, in response to receiving an incoming repeated data message 282, remove the outgoing data message 282 from the echo buffer 269. Sixth, in response to the echo time 270 exceeding the echo time timeout 271 and the outgoing data message 282 being present in the echo buffer 269, retransmit the outgoing data message 282. Seventh, in response to receiving an incoming data message 282, transmit the incoming data message 282 as an outgoing repeated data message 282.

The functions described above occur repeatedly, at least every time the cycle time 242 resets. Network RF nodes 200 in the connected state 250 still transmit set repeater messages 281 every cycle time 242 reset loop. Network RF nodes 200 in the repeater state 249 are not permanently repeating or connected to the same network RF nodes 200—the connections vary based upon repeater scores 254A-K. Therefore, the extended star network 25 reaches equilibriums, but is not static—as the environment changes, affecting repeater scores 254A-K, the connections between network RF nodes 200 will change as well.

Figure 3B:
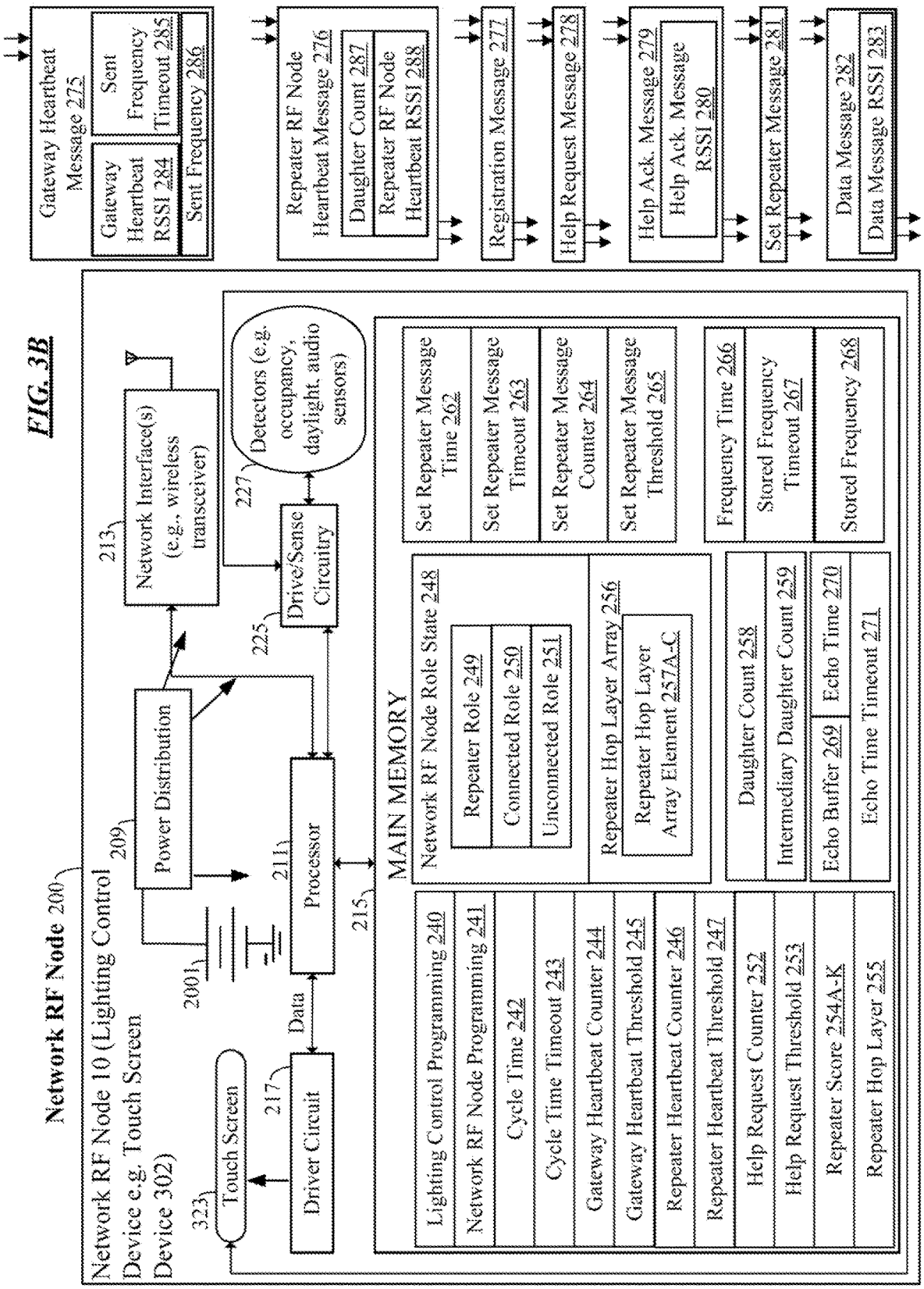
FIG. 3B illustrates a functional block diagram of a lighting system touch screen device RF node configured to act as a network RF node.

FIGS. 3A-B are block diagrams of two types of lighting control devices 10 that communicate via the flooding wireless network 25 of FIG. 1, specifically a wall switch 301 and touchscreen device 323. These control devices 10 are also currently configured to act as connected RF nodes 300, and have the requisite elements to perform their necessary functions in the memory 315. The circuitry, hardware, and software of the lighting control devices 301-302, shown are similar to the luminaire 201, including the memory 315, to implement the self-healing heartbeat protocol 600 described herein. Hence, network RF node memory 215 is shown as including the lighting control programming 240.

This wall switch RF node 301 is configured to operate as a network RF node 200. The distinction between the repeater role 249, the connected role 250, and the unconnected role 251 is entirely within the network RF node memory 215: changing the network RF node role state 248 between the repeater role 249, the connected role 250, and the unconnected role 251 does not add or remove hardware components such as the light source 219, detectors 227, LED indicators 321, or AC power relay 433. The network RF node 10 includes a subset of the components of the wall switch 301 and touch screen device 302 of FIGS. 3A-B, including the network RF node processor 211, network interface(s) 213, and various programming, messages, identifiers, etc. shown in the main memory 315.

This exemplar wall switch RF node 301 contains network RF node programming 241 to allow the wall switch RF node 301 to fulfill the repeater role 249, connected role 250, or the unconnected role 251. The network RF node memory 215 contains all of the same elements as described in the network RF node memory 215 of FIG. 2. Additionally, as shown, wall switch 301 and touchscreen device 302 can include a subset of the circuitry, hardware, and software shown for the luminaire 201 of FIG. 2.

As shown in FIG. 3A, the RF node 10 is a wall switch 301 where the drive/sense circuitry 225 responds to switches 329. Switches 329 can be an on/off switch, dimmer switch, or set scene switch based on Acuity Brands Lighting's commercially available nLight® AIR rES7 product. In some examples, wall switch 301 includes a single shared button switch 329 for on/off, dimming, or set scene functions and the LED indicator 321 of wall switch 301. A button station can include various button settings that can have the lighting control settings adjusted, for example, four buttons can be arranged with two longitudinal buttons (north-south) and two lateral buttons (east-west).

In FIG. 3B, the RF node 10 is a touchscreen device 302 where lighting control setting adjustments are inputted via a user interface application (not shown) through manipulation or gestures on a touch screen 323. For output purposes, the touch screen 323 includes a display screen, such as a liquid crystal display (LCD) or light emitting diode (LED) screen or the like. For input purposes, touch screen 323 includes a plurality of touch sensors.

A keypad may be implemented in hardware as a physical keyboard of touch screen device 302, and keys may correspond to hardware keys of such a keyboard. Alternatively, some or all of the keys (and keyboard) of touchscreen device 300B may be implemented as "soft keys" of a virtual keyboard graphically represented in an appropriate arrangement via touch screen 323. The soft keys presented on the touch screen 323 may allow the user of touchscreen device 302 to invoke the same user interface functions as with the physical hardware keys.

Drive/sense circuitry 225 is coupled to touch sensors of touch screen 323 for detecting the occurrence and relative location/position of each touch with respect to a content display area of touch screen 323. In this example, drive/sense circuitry 225 is configured to provide network RF node processor 211 with touch-position information based on user input received via touch sensors. In some implementations, network RF node processor 211 is configured to correlate the touch position information to specific content being displayed within the content display area on touch screen 323. The touch-position information captured by the drive/sense circuitry 225 and provided to network RF node processor 211 may include, but is not limited to, coordinates identifying the location of each detected touch with respect to the display area of touch screen 323 and a timestamp corresponding to each detected touch position.

In general, touch screen 323 and its touch sensors (and one or more keys, if included) are used to provide a textual and graphical user interface for the network RF node 10. In an example, touch screen 323 provides viewable content to the user at the network RF node 10. Touch screen 323 also enables the user to interact directly with the viewable content provided in the content display area, typically by touching the surface of the screen with a finger or an implement such as a stylus.

Network RF node memory 215 is shown as including the lighting control programming 240, network RF node programming 241, and all of the other elements present in the network RF node memory 215 of FIG. 2. Additionally, as shown, wall switch 301 and touchscreen device 302 can include a subset of the circuitry, hardware, and software shown for the luminaire 201 of FIG. 2.

Figure 4A:
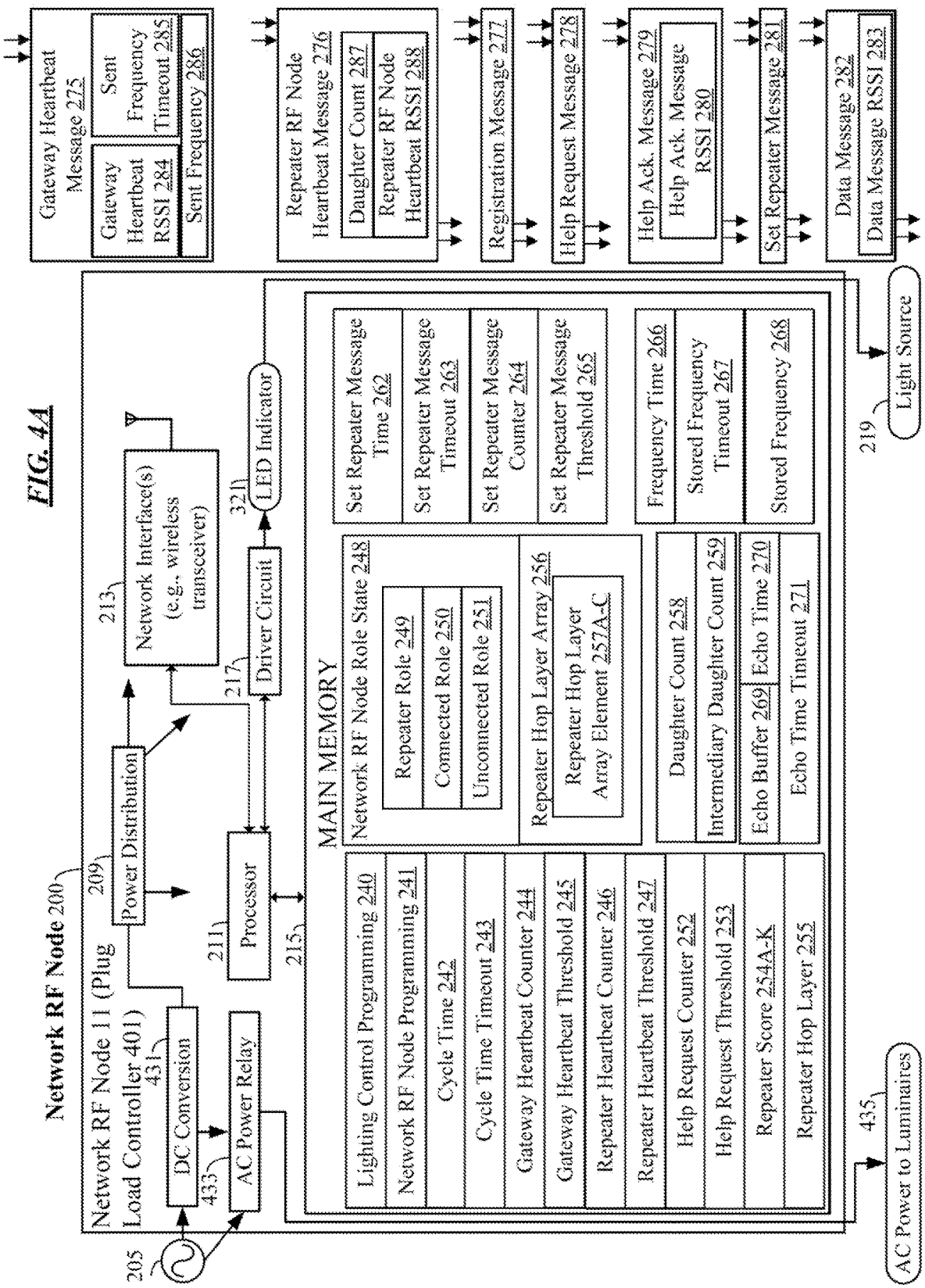
FIG. 4A illustrates a functional block diagram of a lighting system plug load controller RF node configured to act as a network RF node.

FIG. 4A is a block diagram of a plug load controller 401 type of RF node 11 that communicates via the extended star wireless network 25 of FIG. 1. The circuitry, hardware, and software of plug load controller 401 shown is similar to the luminaire 201 of FIG. 2. Hence, network RF node memory 215 is shown as including the lighting control programming 240.

This plug load controller RF node 401 is configured to operate as a network RF node 200. The distinction between the repeater role 249, the connected role 250, and the unconnected role 251 is entirely within the network RF node memory 215: changing the network RF node role state 248 between the repeater role 249, the connected role 250, and the unconnected role 251 does not add or remove hardware components such as the light source 219, detectors 227, LED indicators 321, or AC power relay 433. The network RF node 11-12 includes a subset of the components of the plug load controller 401 and power pack 402 of FIGS. 4A-B, including the network RF node processor 211, network interface(s) 213, and various programming, messages, identifiers, etc. shown in the main memory 415.

This exemplar plug load controller RF node 401 contains repeater RF node configuration programming 442 to allow the plug load controller RF node 401 to fulfill the repeater role 249, connected role 250, or unconnected role 251. The network RF node memory 215 contains all of the same elements as described in the network RF node memory 215 of FIG. 2. Additionally, as shown, plug load controller 401 and power pack 402 can include a subset of the circuitry, hardware, and software shown for the luminaire 201 of FIG. 2.

Plug load controller 401 is a retrofit device that plugs into existing AC wall outlets, for example, and allows existing wired lighting devices, such as table lamps or floor lamps that plug into a wall outlet, to operate in the lighting control system. The plug load controller 401 instantiates the table lamp or floor lamp by allowing for commissioning and maintenance operations and processes wireless lighting controls in order to the allow the lighting device to operate in the lighting system 20. As shown, plug load controller 401 includes a DC conversion circuit 431 (which may instead be a power supply) driven by a power source 205, in our example, an AC line or mains. Power source 205, however, may be a battery, solar panel, or any other AC or DC source.

DC conversion circuit 431 receives power from the power source 205, and may include a magnetic transformer, electronic transformer, switching converter, rectifier, or any other similar type of circuit to convert an input power signal into a suitable power signal to power itself. Plug load controller 401 further comprises an AC power relay 433, which relays incoming AC power from power source 205 to other devices that may plug into the receptacle of plug load controller 400A thus providing an AC power outlet 435.

Plug load controller 401 further includes a driver circuit 217 to drive the external light source 219 of the table or floor lamp, for example. The LED indicator 321 indicates the state of the plug load controller 401, for example, during commissioning and maintenance procedures.

Figure 4B:
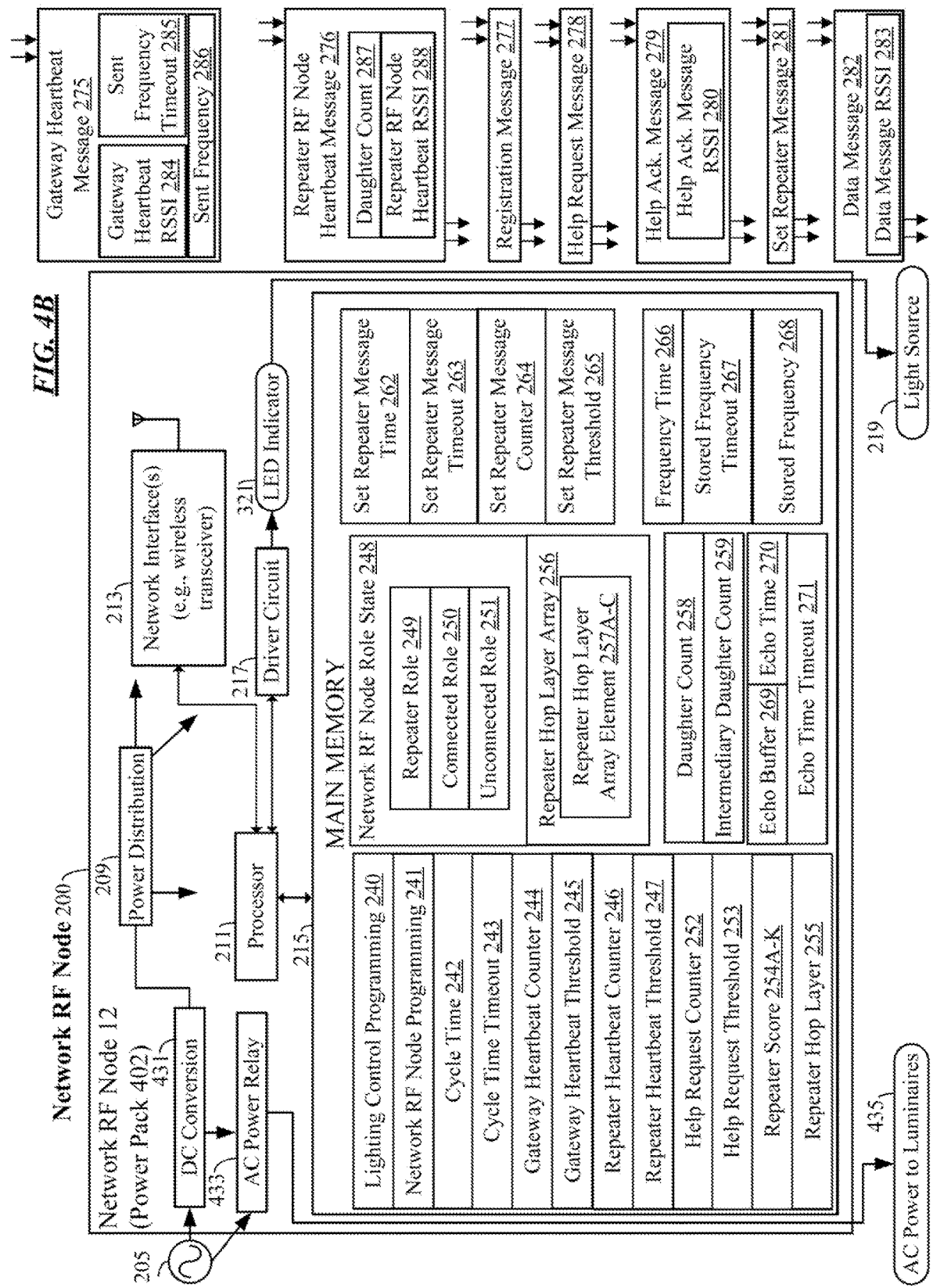
FIG. 4B illustrates a functional block diagram of a lighting system power pack RF node configured to act as a network RF node.

FIG. 4B is a block diagram of a power pack 402 that communicates via the extended star wireless network 25 of FIG. 1. The circuitry, hardware, and software of plug load controller 402 shown is similar to the luminaire 200 of FIG. 2 and plug load controller 401 of FIG. 4A. Hence, network RF node memory 215 is shown as including the lighting control programming 240.

Power pack 402 is a device that retrofits with existing wired light fixtures (luminaires). The power pack 402 instantiates the wired light fixture by allowing for commissioning and maintenance operations and processes wireless lighting controls in order to allow the lighting device to operate in the lighting system 20.

This exemplar power pack RF node 402 contains network RF node configuration programming 241 to allow the power pack RF node 402 to fulfill the repeater role 249, connected role 250, or unconnected role 251. The network RF node memory 215 contains all of the same elements as described in the network RF node memory 215 of FIG. 2. Additionally, as shown, plug load controller 401 and power pack 402 can include a subset of the circuitry, hardware, and software shown for the luminaire 201 of FIG. 2.

Network RF node memory 215 is shown as including the lighting control programming 240, network RF node programming 241, and all of the other elements present in the network RF node memory 215 of FIG. 2.

FIG. 5 is a functional block diagram of the gateway RF node 9, by way of just one example of a computing device platform that may perform the functions of the gateway RF node 9. Although the gateway 9 implements the gateway RF node 9, in the example any of the other RF nodes 1-8 and 10-12 can implement the gateway RF node 9. For example, the gateway RF node 9 can be an integrated luminaire (or a standalone touchscreen device). If the gateway RF node 9 is a luminaire, then gateway RF node 9 is line powered and remains operational as long as power is available. Alternatively, if gateway RF node 9 is a touch screen type device, gateway RF node 9 may be battery powered.

Gateway RF node 9 will generally be described as an implementation of a server or host type computer, e.g. as might be configured as a blade device in a server farm or in network room of a particular premises. Gateway RF node 9 may comprise a mainframe or other type of host computer system. As shown, gateway RF node 9 includes a wireless network interface 513 to and from the extended star wireless network 25 on-premises to RF nodes 1-8 and 10-12 installed in the physical space 21. Gateway RF node 9 also includes another network communication interface 519 for off-premises network communications over the WAN 55.

The gateway RF node 9 in the example includes a central processing unit (CPU) 511 formed of one or more processors, and a main memory 515. The circuitry forming the CPU 511 may contain a single microprocessor, or may contain a number of microprocessors for configuring the computer system as a multi-processor system, or may use a higher speed processing architecture. The main memory 515 in the example includes ROM, RAM and cache memory; although other memory devices may be added or substituted.

The gateway RF node 9 also includes one or more input/output interfaces for communications, shown by way of example as interface 519 for data communications via the WAN 55 as well as a WiFi or Bluetooth type wireless transceiver 513 for communications over the extended star wireless network 25. Network communication interface 519 may be a high-speed modem, an Ethernet (optical, cable or wireless) card or any other appropriate data communications device. The physical communication link(s) to/from the network communication interface 519 may be optical, wired, or wireless (e.g., via satellite or cellular network). Although other transceiver arrangements may be used, the example gateway RF node 9 utilizes a Wi-Fi or Bluetooth type wireless transceiver 513 similar to the other RF nodes 1-8 and 10-12 for communication over the extended star wireless network 25. The wireless transceiver 513 enables the gateway RF node 9 to communicate over-the-air with the Wi-Fi type network RF node wireless transceivers 213 of RF nodes 1-8 and 10-12 of the lighting system 20 via the extended star wireless network 25.

Although not shown, the computer platform configured as the gateway RF node 9 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the gateway RF node 9 for control and programming of the system from remote terminal devices via the Internet or some other link via WAN 55.

The gateway RF node 9 runs a variety of applications programs and stores various information in a database or the like for control of the fixtures, wall controllers, and any other elements of the lighting system 20 and possibly elements of an overall building managements system (BMS) at the premises. One or more such applications, for example, might enable asset tracking, lighting control through the gateway 9 and/or lighting control based on input from the sensors or wall controllers.

In the example of FIG. 5, the gateway RF node 9 includes a wireless transceiver 513 configured for data communication over an extended star wireless network 25 that includes a plurality of radio frequency (RF) nodes 1-8 and 10-12. Gateway RF node 9 includes a processor 511 coupled to the wireless transceiver 513 and a memory 515 accessible to the processor 511. The gateway RF node 9 includes gateway RF node configuration programming 548 in the memory, as well as an RF node identifier 550 of the gateway RF node 9 itself.

The example of FIG. 5 shows a single instance of gateway RF node 9. Of course, the gateway functions may be implemented in a distributed fashion on a number of similar platforms, to distribute the processing load. Additional networked systems (not shown) may be provided to distribute the processing and associated communications, e.g. for load balancing or fail over.

The hardware elements, operating systems and programming languages of computer systems like that of the gateway RF node 9 generally are conventional in nature, and it is presumed that those skilled in the art are sufficiently familiar therewith to understand implementation of the present system and associated lighting control technique using suitable configuration and/or programming of such computer system(s).

The memory 515 of the gateway RF node 9 has substantially fewer necessary elements: essentially, the gateway RF node 9 only needs to track cycle time in order to send gateway heartbeat messages 275, receive registration messages 277, help request messages 278, and possibly send a help acknowledgement message 279, as well as track connected network RF nodes 200, potentially utilizing a daughter count 258.

FIG. 6 is a flowchart of a network RF node connecting and servicing the extended star network 25. In step 602, the network RF node 200 is tracking a cycle time 242. In response to receiving a gateway heartbeat message 275 from a gateway RF node 500 in step 604, the network RF node 200 is incrementing a gateway heartbeat counter 244 in step 608. In response to receiving a respective repeater RF node heartbeat message 276 from a respective network RF node 1 of network RF nodes 1-8 set to a repeater role 249 in step 606, the network RF node 200 is incrementing a repeater heartbeat counter 246 in step 610.

After time passes, in response to the cycle time 242 exceeding a cycle time timeout 243 in step 612, the gateway heartbeat counter 244 not exceeding a gateway heartbeat threshold 245 in step 614, and the repeater heartbeat counter 246 exceeding a repeater heartbeat threshold 247 in step 616, selecting a selected network RF node 1 of the RF nodes 1-8 set to the repeater role 249 and transmitting, via an extended star wireless network 251, a registration message 277 to the selected network RF node 1 occurs in step 620. In response to transmitting the registration message 277 to the selected RF node 1 and having a network RF node role state set 248 to an unconnected role 251, setting the network RF node role state 248 to a connected role 250 in step 618.

Alternatively, in response to the cycle time 242 exceeding the cycle time timeout 243 in step 612, the gateway heartbeat counter 244 exceeding the gateway heartbeat threshold 245 in step 614, and having the network RF node role state 248 set to the unconnected role 251, setting the network RF node role state 248 to the connected role 250 in step 618 occurs.

Continuing, in response to the cycle time 242 exceeding the cycle time timeout 243 in step 612 and the gateway heartbeat counter 244 exceeding the gateway heartbeat threshold 245 in step 614 or the repeater heartbeat counter 246 exceeding a repeater heartbeat threshold 247 in step 616, resetting a help request counter 252 in step 622. In response to the cycle time 242 exceeding the cycle time timeout 243 in step 612, the gateway heartbeat counter 244 not exceeding the gateway heartbeat threshold 245 in step 614, and the repeater heartbeat counter 246 not exceeding the repeater heartbeat threshold 247 in step 616, incrementing the help request counter 252 in step 624. In response to the help request counter 252 exceeding the help request threshold 253 in step 626, transmitting a help request message 278 in step 628 occurs. In response to transmitting the help request message 278 in step 628, receiving one or more help acknowledgement messages 279 sent from one or more neighbor RF network nodes 1-4 of the RF network nodes 1-8 in step 630, the help acknowledgement messages 279 each including a help acknowledgement message received signal strength indication (RSSI) 280.

In response to receiving the one or more help acknowledgement messages 279 in step 630, selecting a best help acknowledgement message 279, the best help acknowledgement message 279 having a highest help acknowledgement RSSI 280 in step 632. In response to selecting the best help acknowledgement message 279 in step 632, transmitting a set repeater message 281 to a preferred neighbor RF network node 2 of the one or more neighbor RF network nodes 1-4 in step 634, the preferred neighbor RF network node 2 having sent the best help acknowledgement message 279.

Alternatively, calculating a repeater score 254A-K based upon a respective repeater hop layer 255 of the respective network RF node 200, a respective daughter count 258 of the respective network RF node 200, and a respective repeater RF node heartbeat received signal strength indication (RSSI) 288 of the respective repeater RF node heartbeat message 276 from the respective network RF node 200 in step 636 occurs. Then, selecting a preferred repeater network RF node 3, the preferred repeater network RF node 200 having a highest repeater score 254A-K in step 638. In response to selecting the preferred repeater network RF node 3 in step 638, transmitting a set repeater message 281 to the preferred repeater network RF node 3 in step 634.

Figure 7:
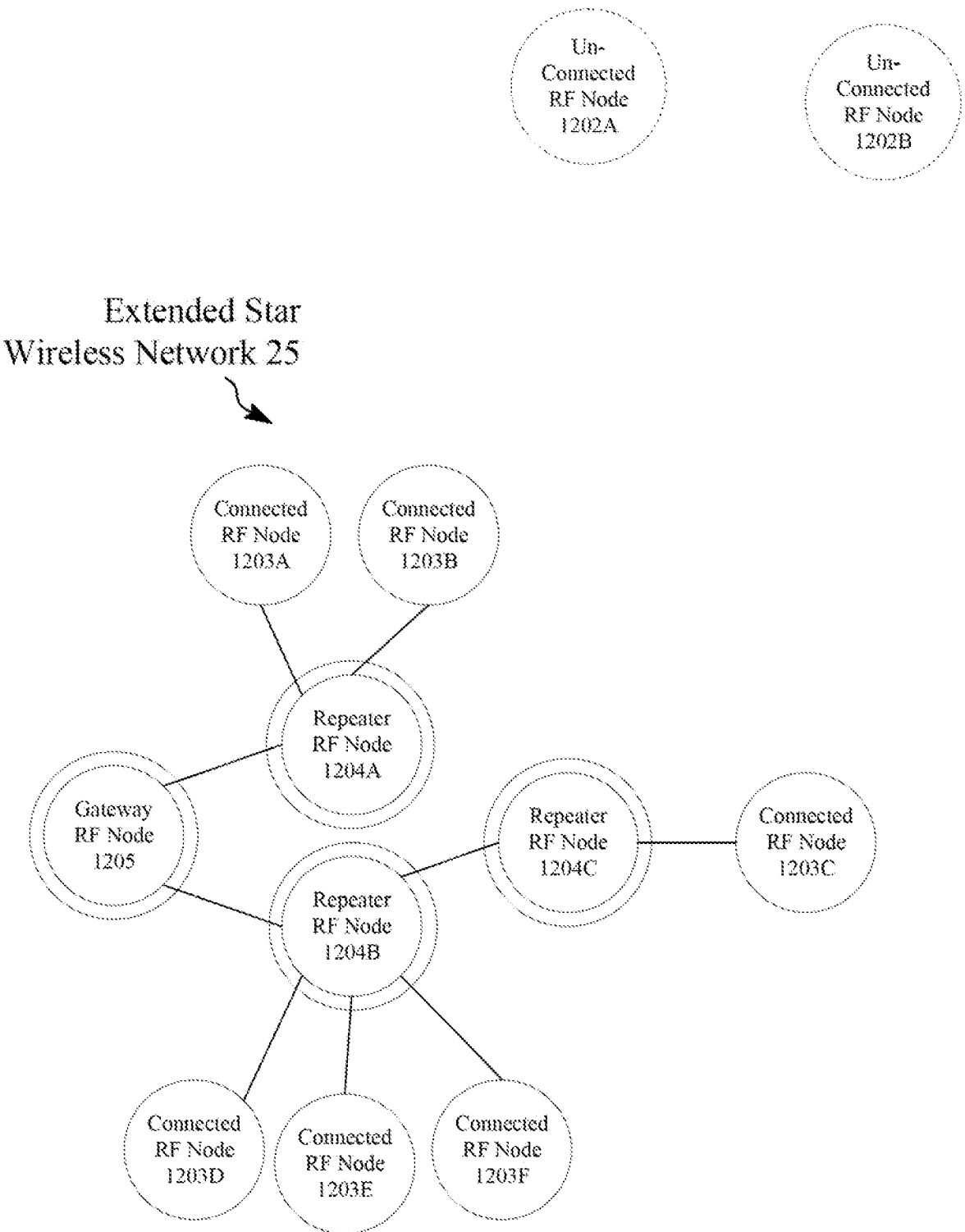
FIG. 7 is a schematic of an example extended star wireless RF node network.

FIG. 7 is a schematic of an example extended star wireless network, specifically illustrating the RF node roles, and the connections between nodes. It contains a gateway RF node 1205, repeater RF nodes 1204A-C which are network RF nodes 1-3 with the repeater role 249, connected RF nodes 1203A-F which are network RF nodes 4-8, 10 with the connected role 250, and unconnected RF nodes 1202A-B which are network RF nodes 11-12 with the unconnected role 251. First, the gateway 1205, repeater 1204, connected 1203, and unconnected RF nodes 1202 can be embodied in any kind of lighting system 20 structure. Meaning, any of these nodes could be a luminaire 200, wall switch 301, touch screen device 302, plug load controller 401, power pack 402, or any other type of RF node configured to connect to the extended star wireless network 25 and take the repeater role 249, connected role 250, or unconnected role 251.

In this example, there are twelve nodes. There is a gateway RF node 1205 configured as an RF gateway node 500, which has two RF nodes 1204A, 1204B within its radio range. These two nodes 1204A, 1204B are connected to the gateway RF node 1205. Therefore, these two nodes 1204A, 1204B are initially configured as network RF nodes 200 in the connected role 250.

Next, there are six other RF nodes 1203A, 1203B, 1204C, 1203D, 1203E, 1203F that are set as network RF nodes 200 in the unconnected role 251, within the range of the two first nodes 1204A, 1204B, but that are not within range of gateway RF node 1205. Therefore, these six nodes 1203A, 1203B, 1203D, 1203E, 1203F, 1204C request that the two connected nodes 1204A, 1204B set their network RF node role states 248 to the repeater role 249, and connect the six RF nodes 1203A, 1203B, 1203D, 1203E, 1203F, 1204C to the gateway RF node 1205. All six RF nodes 1203A, 1203B, 1203D, 1203E, 1203F, 1204C then set their network RF node role state 248 to the connected role 250, with the two RF nodes 1203A, 1203B connecting to the newly configured repeater 1204A, and the remaining four nodes 1203D, 1203E, 1203F 1204C connecting to the newly configured second repeater node 1204B. RF node 1204C is close enough to both repeater nodes 1204A, 1204B to connect to either repeater RF node 1204A, 1204B, but selects the second repeater RF node 1204B, as it has a higher repeater score than repeater node 1204A (whereas the number of daughters is an aspect of the repeater score.)

Further, there is an RF node 1203C that is within the range of connected RF node 1204C, but not within range of repeater nodes 1204A, 1204B, or gateway RF node 1205. This node 1203C requests that the node 1204C set their network RF node role state 248 to the repeater role 249, and connect the node 1203C to the gateway RF node 1205. Connected RF node 1204C then sets their network RF node role state 248 to the repeater role 249, becoming the third repeater RF node 1204C, and connects the new connected RF node 1203C to the gateway RF node 1205 via the third repeater RF node's 1204C forwarding RF node 1204B.

Additionally, there are two RF nodes 1202A, 1202B that are within range of each other, but no other nodes, including the gateway RF node 1205. These nodes are unable to request a connection from any other network RF node 200 or gateway RF node 500 and will receive no help acknowledgement messages, or heartbeat messages. Consequently, these two nodes 1202A, 1202B will remain non-connected RF nodes 200, unconnected to the extended star network 25.

Finally, after all possible connections are made and optimized, the extended star wireless network 25 is as depicted: a single gateway RF node 1205, connected to a repeater RF node 1204A, which forwards for connected RF nodes 1203A, 1203B. A second repeater RF node 1204B is also connected to the gateway RF node 1205, and forwards for connected RF nodes 1203D, 1203E, 1203F, as well as repeater RF node 1204C. This third repeater RF node 1204C forwards for another connected RF node 1203C. Last, the two non-connected RF nodes 1202A, 1202B are unconnected to the gateway RF node 1205, both by direct connection as well as forwarded connection, and are therefore not connected to the extended star wireless network 25, though they may be part of the lighting system 20, and may also exist in the same physical space 21 as the other RF nodes 1202, 1203, 1205.

Any of the steps or functionality of the node configuration programming 242, 244, and 246 described herein for the RF nodes (e.g., luminaires 1-8, gateway 9, lighting control device 10, plug load controller 11, and power pack 12) of the lighting system 20 can be embodied in programming or one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A radio frequency (RF) communication system comprising: a plurality of RF nodes including a gateway RF node and a plurality of network RF nodes, wherein each of the network RF nodes includes:
   a network RF node wireless transceiver configured for data communication over an extended star wireless network that includes the plurality of network RF nodes;
   a network RF node processor coupled to the network RF node wireless transceiver;
   a network RF node memory accessible to the network RF node processor including:
      a cycle time and a cycle time timeout,
      a gateway heartbeat counter and a gateway heartbeat threshold,
      a repeater heartbeat counter and a repeater heartbeat threshold, and
      a network RF node role state set to a repeater role, a connected role, or an unconnected role; and
   network RF node programming in the network RF node memory, wherein execution of the network RF node programming by the network RF node processor configures the network RF node to implement functions, including functions to:
      track the cycle time;
      in response to receiving a gateway heartbeat message from the gateway RF node, increment the gateway heartbeat counter;
      in response to receiving a respective repeater RF node heartbeat message from a respective network RF node of the network RF nodes set to the repeater role, increment the repeater heartbeat counter;
      in response to the cycle time exceeding the cycle time timeout, the gateway heartbeat counter not exceeding the gateway heartbeat threshold, and the repeater heartbeat counter exceeding the repeater heartbeat threshold, select a selected network RF node of the RF nodes set to the repeater role;
      transmit, via the extended star wireless network, a registration message to the selected network RF node; and
      in response to transmitting the registration message to the selected RF node and having the network RF node role state set to the unconnected role, set the network RF node role state to the connected role.

2. The RF communication system of claim 1, wherein:
   execution of the network RF node programming by the network RF node processor further configures the network RF node to implement functions, including functions to:
      in response to the cycle time exceeding the cycle time timeout, the gateway heartbeat counter exceeding the gateway heartbeat threshold, and having the network RF node role state set to the unconnected role, set the network RF node role state to the connected role.

3. The RF communication system of claim 1, wherein:
   the network RF node memory further includes a help request counter and a help request threshold; and
   execution of the network RF node programming by the network RF node processor further configures the network RF node to implement functions, including functions to:
      in response to the cycle time exceeding the cycle time timeout and the gateway heartbeat counter exceeding the gateway heartbeat threshold or the repeater heartbeat counter exceeding the repeater heartbeat threshold, reset the help request counter;
      in response to the cycle time exceeding the cycle time timeout, the gateway heartbeat counter not exceeding the gateway heartbeat threshold, and the repeater heartbeat counter not exceeding the repeater heartbeat threshold, increment the help request counter;
      in response to the help request counter exceeding the help request threshold, transmit a help request message;

in response to transmitting the help request message, receive one or more help acknowledgement messages sent from one or more neighbor RF network nodes of the plurality of RF network nodes, the help acknowledgement messages each including a help acknowledgement message received signal strength indication (RSSI);

in response to receiving the one or more help acknowledgement messages, select a best help acknowledgement message, the best help acknowledgement message having a highest help acknowledgement RSSI; and in response to selecting the best help acknowledgement message, transmit a set repeater message to a preferred neighbor RF network node of the one or more neighbor RF network nodes, the preferred neighbor RF network node having sent the best help acknowledgement message.

4. The RF communication system of claim 3, wherein:
execution of the network RF node programming by the network RF node processor further configures the network RF node to implement functions, including functions to:
in response to:
receiving the help request message, and
having the network RF node role state set to the connected role,
transmit the help acknowledgement message.

5. The RF communication system of claim 3, wherein:
execution of the network RF node programming by the network RF node processor further configures the network RF node to implement functions, including functions to:
in response to receiving the set repeater message and having the network RF node role state set to the connected role, set the network RF node role state to the repeater role.

6. The RF communication system of claim 1, wherein:
the function to select the selected network RF node of the RF nodes set to the repeater role further includes:
calculate a repeater score based upon a respective repeater hop layer of the respective network RF node, a respective daughter count of the respective network RF node, and a respective repeater RF node heartbeat received signal strength indication (RSSI) of the respective repeater RF node heartbeat message from the respective network RF node; and
select a preferred repeater network RF node, the preferred repeater network RF node having a highest repeater score; and
in response to selecting the preferred repeater network RF node, transmit a set repeater message to the preferred repeater network RF node.

7. The RF communication system of claim 6, wherein:
the network RF node memory further includes a repeater hop layer; and
execution of the network RF node programming by the network RF node processor further configures the network RF node to implement functions, including functions to:
in response to selecting the preferred repeater network RF node, set the repeater hop layer to a preferred repeater hop layer of the preferred repeater network RF node plus one; and
transmit the repeater RF node heartbeat message, the repeater RF node heartbeat message including the repeater hop layer.

8. The RF communication system of claim 6, wherein:
the network RF node memory further includes a repeater hop layer and a repeater hop layer array; and
execution of the network RF node programming by the network RF node processor further configures the network RF node to implement functions, including functions to:
in response to selecting the preferred repeater network RF node, create a respective repeater hop layer array element equal to a preferred repeater hop layer of the preferred repeater network RF node plus one, and add the respective repeater hop layer array element to the repeater hop layer array;
set the repeater hop layer to a minimum repeater hop layer array element of the repeater hop layer array; and
transmit the repeater RF node heartbeat message, the repeater RF node heartbeat message including the repeater hop layer.

9. The RF communication system of claim 1, wherein:
the network RF node memory further includes a repeater hop layer; and
execution of the RF network node programming by the network RF node processor further configures the network RF node to implement functions, including functions to:
in response to the cycle time exceeding the cycle time timeout, the gateway heartbeat counter exceeding the gateway heartbeat threshold, and having the network RF node role state set to the repeater role, set the repeater hop layer to one; and
transmit the repeater RF node heartbeat message, the repeater RF node heartbeat message including the repeater hop layer.

10. The RF communication system of claim 1, wherein:
the network RF node memory further includes a daughter count and an intermediary daughter count; and
execution of the RF network node programming by the network RF node processor further configures the network RF node to implement functions, including functions to:
in response to receiving the set repeater message and having the network RF node role state set to the repeater role, increment the intermediary daughter count;
in response to the cycle time exceeding the cycle time timeout and having the network RF node role state set to the repeater role, set the daughter count equal to the intermediary daughter count, and reset the intermediary daughter count; and
transmit the repeater RF node heartbeat message, the repeater RF node heartbeat message including the daughter count.

11. The RF communication system of claim 1, wherein:
the network RF node memory further includes:
a set repeater message time and a set repeater message timeout,
a set repeater message counter and a set repeater message threshold; and
execution of the RF network node programming by the network RF node processor further configures the network RF node to implement functions, including functions to:
track the set repeater message time;
in response to receiving the set repeater message, increment the set repeater message counter;

in response to the set repeater message time exceeding the set repeater message time timeout, the set repeater message counter not exceeding the set repeater message threshold and having the network RF node role state set to the repeater role, set the network RF node role state to the connected role; and in response to the set repeater message time exceeding the set repeater message timeout, reset the set repeater message counter.

12. The RF communication system of claim 1, wherein:
execution of the RF network node programming by the network RF node processor further configures the network RF node to implement functions, including functions to:
transmit a data message;
a data message received signal strength indication (RSSI) of the data message is greater than a gateway heartbeat RSSI of the gateway heartbeat message; and
the data message RSSI of the data message is greater than a respective repeater RF node heartbeat RSSI of the respective repeater RF node heartbeat message.

13. The RF communication system of claim 1, wherein:
the gateway heartbeat message further includes a sent frequency and a sent frequency timeout;
the network RF node memory further includes a frequency time, a stored frequency timeout, and a stored frequency; and
execution of the RF network node programming by the network RF node processor further configures the network RF node to implement functions, including functions to:
in response to receiving the gateway heartbeat message including the sent frequency and the sent frequency timeout, set the stored frequency timeout equal to the sent frequency timeout;
track the frequency time;
in response to the frequency time exceeding the stored frequency timeout, set the stored frequency equal to the sent frequency.

14. The RF communication system of claim 1, wherein the RF communication system is a wireless industrial device control system or a wireless lighting system.

15. The RF communication system of claim 1, wherein:
execution of the network RF node programming by the network RF node processor further configures the network RF node to implement functions, including functions to:
in response to the cycle time exceeding the cycle time timeout, reset the cycle time, the gateway heartbeat counter, and the repeater heartbeat counter.

16. The RF communication system of claim 1, wherein:
the network RF node memory further includes a echo buffer, an echo time, and an echo time timeout; and
execution of the RF network node programming by the network RF node processor further configures the network RF node to implement functions, including functions to:
transmit an outgoing data message;
track the echo time;
add the data message to the echo buffer;
in response to adding the data message to the echo buffer, reset the echo time;
in response to receiving an incoming repeated data message, remove the outgoing data message from the echo buffer;

in response to the echo time exceeding the echo time timeout and the data message being present in the echo buffer, retransmit the data message; and in response to receiving an incoming data message, transmit the incoming data message as an outgoing repeated data message.

17. A method comprising:
tracking a cycle time;
in response to receiving a gateway heartbeat message from a gateway RF node, incrementing a gateway heartbeat counter;
in response to receiving a respective repeater RF node heartbeat message from a respective network RF node of network RF nodes set to a repeater role, incrementing a repeater heartbeat counter;
in response to the cycle time exceeding a cycle time timeout, the gateway heartbeat counter not exceeding a gateway heartbeat threshold, and the repeater heartbeat counter exceeding a repeater heartbeat threshold, selecting a selected network RF node of the RF nodes set to the repeater role;
transmitting, via an extended star wireless network, a registration message to the selected network RF node; and
in response to transmitting the registration message to the selected RF node and having a network RF node role state set to an unconnected role, setting the network RF node role state to a connected role.

18. The method of claim 17, further comprising:
in response to the cycle time exceeding the cycle time timeout, the gateway heartbeat counter exceeding the gateway heartbeat threshold, and having the network RF node role state set to the unconnected role, setting the network RF node role state to the connected role.

19. The method of claim 17, further comprising:
in response to the cycle time exceeding the cycle time timeout and the gateway heartbeat counter exceeding the gateway heartbeat threshold or the repeater heartbeat counter exceeding a repeater heartbeat threshold, resetting a help request counter;
in response to the cycle time exceeding the cycle time timeout, the gateway heartbeat counter not exceeding the gateway heartbeat threshold, and the repeater heartbeat counter not exceeding the repeater heartbeat threshold, incrementing the help request counter;
in response to the help request counter exceeding the help request threshold, transmitting a help request message;
in response to transmitting the help request message, receiving one or more help acknowledgement messages sent from one or more neighbor RF network nodes of the RF network nodes, the help acknowledgement messages each including a help acknowledgement message received signal strength indication (RSSI);
in response to receiving the one or more help acknowledgement messages, selecting a best help acknowledgement message, the best help acknowledgement message having a highest help acknowledgement RSSI; and
in response to selecting the best help acknowledgement message, transmitting a set repeater message to a preferred neighbor RF network node of the one or more neighbor RF network nodes, the preferred neighbor RF network node having sent the best help acknowledgement message.

20. The method of claim 17, further comprising:
calculating a repeater score based upon a respective repeater hop layer of the respective network RF node, a respective daughter count of the respective network RF node, and a respective repeater RF node heartbeat received signal strength indication (RSSI) of the respective repeater RF node heartbeat message from the respective network RF node; and
selecting a preferred repeater network RF node, the preferred repeater network RF node having a highest repeater score; and
in response to selecting the preferred repeater network RF node, transmitting a set repeater message to the preferred repeater network RF node.

\* \* \* \* \*